(12) United States Patent
Doughty et al.

(10) Patent No.: US 8,799,076 B2
(45) Date of Patent: Aug. 5, 2014

(54) IDENTIFYING A SAME USER OF MULTIPLE COMMUNICATION DEVICES BASED ON USER LOCATIONS

(71) Applicant: Jumptap, Inc., Boston, MA (US)

(72) Inventors: Dennis L. Doughty, Brookline, MA (US); Benjamin M. Gordan, Hingham, MA (US); Shrikanth B. Mysore, Littleton, MA (US); Matthew A. Tengler, Upton, MA (US)

(73) Assignee: Millennial Media, Inc., Boston, MA (US)

( * ) Notice: Subject to any disclaimer, the term of this patent is extended or adjusted under 35 U.S.C. 154(b) by 0 days.

(21) Appl. No.: 13/691,020

(22) Filed: Nov. 30, 2012

(65) Prior Publication Data
US 2013/0124315 A1    May 16, 2013

Related U.S. Application Data

(63) Continuation of application No. 13/666,690, filed on Nov. 1, 2012.

(60) Provisional application No. 61/558,522, filed on Nov. 11, 2011, provisional application No. 61/569,217, filed on Dec. 9, 2011, provisional application No. 61/576,963, filed on Dec. 16, 2011, provisional application No. 61/652,834, filed on May 29, 2012.

(51) Int. Cl.
*G06Q 30/00* (2012.01)
*G06Q 30/02* (2012.01)

(52) U.S. Cl.
CPC ........ *G06Q 30/0269* (2013.01); *G06Q 30/0255* (2013.01); *G06Q 30/0251* (2013.01)
USPC .................... 705/14.66; 705/14.53; 705/14.49

(58) Field of Classification Search
USPC ...................................................... 705/14.66
See application file for complete search history.

(56) References Cited

U.S. PATENT DOCUMENTS

| | | | |
|---|---|---|---|
| 5,881,234 A * | 3/1999 | Schwob | 709/219 |
| 6,226,752 B1 | 5/2001 | Gupta et al. | |
| 2003/0139175 A1 | 7/2003 | Kim | |
| 2003/0212893 A1 | 11/2003 | Hind et al. | |
| 2008/0109307 A1 * | 5/2008 | Ullah | 705/14 |
| 2008/0126180 A1 | 5/2008 | Ullah | |
| 2010/0211576 A1 | 8/2010 | Johnson | |
| 2010/0228614 A1 | 9/2010 | Zhang et al. | |
| 2011/0238192 A1 | 9/2011 | Shah et al. | |

* cited by examiner

*Primary Examiner* — John G Weiss
*Assistant Examiner* — Scott C Anderson
(74) *Attorney, Agent, or Firm* — Millennial Media

(57) ABSTRACT

A system for identifying a same user of multiple communication devices is configured to perform the steps of: (a) receiving first data relating to a first device operated by a user; (b) receiving second data relating to a second device operated by a user; (c) determining that the user of the first device is the user of the second device based on identifying that the first data is substantially the same as the second data; and (d) selecting and transmitting a sponsored content to the second device for display thereon, wherein the sponsored content has a relevance to the first and second data and/or a user characteristic datum associated with the user.

8 Claims, 10 Drawing Sheets

IDENTIFYING A SAME USER OF MULTIPLE COMMUNICATION DEVICES BASED ON USER LOCATIONS

CROSS REFERENCE TO RELATED APPLICATIONS

This application is a continuation of U.S. patent application Ser. No. 13/666,690 filed Nov. 1, 2012, and titled "Identifying a Same User of Multiple Communication Device Based on Web Page Visits," which claims the benefit of U.S. Provisional Pat. App. No. 61/558,522 filed Nov. 11, 2011, and titled "Targeted Advertising Across a Plurality of Mobile and Non-Mobile Communication Facilities Accessed By the Same User," U.S. Provisional Pat. App. No. 61/569,217 filed Dec. 9, 2011, and titled "Targeted Advertising Across Web Activities On an MCF and Applications Operating Thereon," U.S. Provisional Pat. App. No. 61/576,963 filed Dec. 16, 2011, and titled "Targeted Advertising to Mobile Communication Facilities," and U.S. Provisional Pat. App. No. 61/652, 834 filed May 29, 2012, and titled "Validity of Data for Targeting Advertising Across a Plurality of Mobile and Non-Mobile Communication Facilities Accessed By the Same User," the contents of which are incorporated herein by reference.

This application also incorporates herein by reference the content of each of the following applications: U.S. application Ser. No. 13/018,952 filed on Feb. 1, 2011, which is a non-provisional of App. No. 61/300,333 filed on Feb. 1, 2010 and entitled "INTEGRATED ADVERTISING SYSTEM," and which is a continuation-in-part of U.S. application Ser. No. 12/537,814 filed on Aug. 7, 2009 and entitled "CONTEXTUAL TARGETING OF CONTENT USING A MONETIZATION PLATFORM," which is a continuation of U.S. application Ser. No. 12/486,502 filed on Jun. 17, 2009 and entitled "USING MOBILE COMMUNICATION FACILITY DEVICE DATA WITHIN A MONETIZATION PLATFORM," which is a continuation of U.S. application Ser. No. 12/485,787 filed on Jun. 16, 2009 and entitled "MANAGEMENT OF MULTIPLE ADVERTISING INVENTORIES USING A MONETIZATION PLATFORM," which is a continuation of U.S. application Ser. No. 12/400,199 filed on Mar. 9, 2009 and entitled "USING MOBILE APPLICATION DATA WITHIN A MONETIZATION PLATFORM," which is a continuation of U.S. application Ser. No. 12/400,185 filed on Mar. 9, 2009 and entitled "REVENUE MODELS ASSOCIATED WITH SYNDICATION OF A BEHAVIORAL PROFILE USING A MONETIZATION PLATFORM," which is a continuation of U.S. application Ser. No. 12/400, 166 filed on Mar. 9, 2009 and entitled "SYNDICATION OF A BEHAVIORAL PROFILE USING A MONETIZATION PLATFORM," which is a continuation of U.S. application Ser. No. 12/400,153 filed on Mar. 9, 2009 and entitled "SYNDICATION OF A BEHAVIORAL PROFILE ASSOCIATED WITH AN AVAILABILITY CONDITION USING A MONETIZATION PLATFORM," which is a continuation of U.S. application Ser. No. 12/400,138 filed on Mar. 9, 2009 and entitled "AGGREGATION AND ENRICHMENT OF BEHAVIORAL PROFILE DATA USING A MONETIZATION PLATFORM," which is a continuation of U.S. application Ser. No. 12/400,096 filed on Mar. 9, 2009 and entitled "AGGREGATION OF BEHAVIORAL PROFILE DATA USING A MONETIZATION PLATFORM," which is a non-provisional of App. No. 61/052,024 filed on May 9, 2008 and entitled "MONETIZATION PLATFORM" and App. No. 61/037,617 filed on Mar. 18, 2008 and entitled "PRESENTING CONTENT TO A MOBILE COMMUNICATION FACILITY BASED ON CONTEXTUAL AND BEHAVIORIAL DATA RELATING TO A PORTION OF A MOBILE CONTENT," and which is a continuation-in-part of U.S. application Ser. No. 11/929,328 filed on Oct. 30, 2007 and entitled "CATEGORIZATION OF A MOBILE USER PROFILE BASED ON BROWSE BEHAVIOR," which is a continuation-in-part of U.S. application Ser. No. 11/929,308 filed on Oct. 30, 2007 and entitled "MOBILE DYNAMIC ADVERTISEMENT CREATION AND PLACEMENT," which is a continuation-in-part of U.S. application Ser. No. 11/929,297 filed on Oct. 30, 2007 and entitled "MOBILE COMMUNICATION FACILITY USAGE AND SOCIAL NETWORK CREATION", which is a continuation-in-part of U.S. application Ser. No. 11/929,272 filed on Oct. 30, 2007 and entitled "INTEGRATING SUBSCRIPTION CONTENT INTO MOBILE SEARCH RESULTS," which is a continuation-in-part of U.S. application Ser. No. 11/929,253 filed on Oct. 30, 2007 and entitled "COMBINING MOBILE AND TRANSCODED CONTENT IN A MOBILE SEARCH RESULT," which is a continuation-in-part of U.S. application Ser. No. 11/929,171 filed on Oct. 30, 2007 and entitled "ASSOCIATING MOBILE AND NONMOBILE WEB CONTENT," which is a continuation-in-part of U.S. application Ser. No. 11/929,148 filed on Oct. 30, 2007 and entitled "METHODS AND SYSTEMS OF MOBILE QUERY CLASSIFICATION," which is a continuation-in-part of U.S. application Ser. No. 11/929,129 filed on Oct. 30, 2007 and entitled "MOBILE USER PROFILE CREATION BASED ON USER BROWSE BEHAVIORS," which is a continuation-in-part of U.S. application Ser. No. 11/929,105 filed on Oct. 30, 2007 and entitled "METHODS AND SYSTEMS OF MOBILE DYNAMIC CONTENT PRESENTATION," which is a continuation-in-part of U.S. application Ser. No. 11/929,096 filed on Oct. 30, 2007 and entitled "METHODS AND SYSTEMS FOR MOBILE COUPON TRACKING," which is a continuation-in-part of U.S. application Ser. No. 11/929,081 filed on Oct. 30, 2007 and entitled "REALTIME SURVEYING WITHIN MOBILE SPONSORED CONTENT," which is a continuation-in-part of U.S. application Ser. No. 11/929,059 filed on Oct. 30, 2007 and entitled "METHODS AND SYSTEMS FOR MOBILE COUPON PLACEMENT," which is a continuation-in-part of U.S. application Ser. No. 11/929,039 filed on Oct. 30, 2007 and entitled "USING A MOBILE COMMUNICATION FACILITY FOR OFFLINE AD SEARCHING," which is a continuation-in-part of U.S. application Ser. No. 11/929,016 filed on Oct. 30, 2007 and entitled "LOCATION BASED MOBILE SHOPPING AFFINITY PROGRAM," which is a continuation-in-part of U.S. application Ser. No. 11/928,990 filed on Oct. 30, 2007 and entitled "INTERACTIVE MOBILE ADVERTISEMENT BANNERS," which is a continuation-in-part of U.S. application Ser. No. 11/928,960 filed on Oct. 30, 2007 and entitled "IDLE SCREEN ADVERTISING," which is a continuation-in-part of U.S. application Ser. No. 11/928,937 filed on Oct. 30, 2007 and entitled "EXCLUSIVITY BIDDING FOR MOBILE SPONSORED CONTENT," which is a continuation-in-part of U.S. application Ser. No. 11/928,909 filed on Oct. 30, 2007 and entitled "EMBEDDING A NONSPONSORED MOBILE CONTENT WITHIN A SPONSORED MOBILE CONTENT," which is a continuation-in-part of U.S. application Ser. No. 11/928,877 filed on Oct. 30, 2007 and entitled "USING WIRELESS CARRIER DATA TO INFLUENCE MOBILE SEARCH RESULTS," which is a continuation-in-part of U.S. application Ser. No. 11/928,847 filed on Oct. 30, 2007 and entitled "SIMILARITY BASED LOCATION MAPPING OF MOBILE COMMUNICATION FACILITY USERS," which is a continuation-in-part of U.S. application Ser. No. 11/928,819 filed on Oct. 30, 2007 and entitled "TARGETING MOBILE SPONSORED CONTENT WITHIN A SOCIAL NETWORK," which is a non-provisional of U.S. App. No. 60/946,132 filed on Jun. 25, 2007 and entitled "BUSINESS STREAM: EXPLORING NEW ADVERTISING OPPORTUNITIES AND AD FORMATS," and U.S. App. No. 60/968,188 filed on Aug. 27, 2007 and entitled "MOBILE CONTENT SEARCH" and a continuation-in-part of U.S. application Ser. No. 11/553,746 filed on Oct. 27, 2006 and entitled "COMBINED ALGORITHMIC AND EDITORIAL-REVIEWED MOBILE CONTENT SEARCH RESULTS," which is a continuation of U.S. application Ser. No. 11/553,713 filed on Oct. 27, 2006 and entitled "ON-OFF HANDSET SEARCH BOX," which is a continuation of U.S. application Ser. No. 11/553,659 filed on Oct. 27, 2006 and entitled "CLIENT LIBRARIES FOR MOBILE CONTENT," which is a continuation of U.S. application Ser. No. 11/553,569 filed on Oct. 27, 2006 and entitled "ACTION FUNCTIONALITY FOR MOBILE CONTENT SEARCH RESULTS," which is a continuation of U.S. application Ser. No. 11/553,626 filed on Oct. 27, 2006 and entitled "MOBILE WEBSITE ANALYZER," which is a continuation of U.S. application Ser. No. 11/553,598 filed on Oct. 27, 2006 and entitled "MOBILE PAY PER CALL," which is a continuation of U.S. application Ser. No. 11/553,587 filed on Oct. 27, 2006 and entitled "MOBILE CONTENT CROSS-INVENTORY YIELD OPTIMIZATION," which is a continuation of U.S. application Ser. No. 11/553,581 filed on Oct. 27, 2006 and entitled "MOBILE PAYMENT FACILITATION," which is a continuation of U.S. application Ser. No. 11/553,578 filed on Oct. 27, 2006 and entitled "BEHAVIORAL-BASED MOBILE CONTENT PLACEMENT ON A MOBILE COMMUNICATION FACILITY," which is a continuation application of U.S. application Ser. No. 11/553,567 filed on Oct. 27, 2006 and entitled "CONTEXTUAL MOBILE CONTENT PLACEMENT ON A MOBILE COMMUNICATION FACILITY", which is a continuation-in-part of U.S. application Ser. No. 11/422,797 filed on Jun. 7, 2006 and entitled "PREDICTIVE TEXT COMPLETION FOR A MOBILE COMMUNICATION FACILITY", which is a continuation-in-part of U.S. application Ser. No. 11/383,236 filed on May 15, 2006 and entitled "LOCATION BASED PRESENTATION OF MOBILE CONTENT", which is a continuation-in-part of U.S. application Ser. No. 11/382,696 filed on May 10, 2006 and entitled "MOBILE SEARCH SERVICES RELATED TO DIRECT IDENTIFIERS", which is a continuation-in-part of U.S. application Ser. No. 11/382,262 filed on May 8, 2006 and entitled "INCREASING MOBILE INTERACTIVITY", which is a continuation of U.S. application Ser. No. 11/382,260 filed on May 8, 2006 and entitled "AUTHORIZED MOBILE CONTENT SEARCH RESULTS", which is a continuation of U.S. application Ser. No. 11/382,257 filed on May 8, 2006 and entitled "MOBILE SEARCH SUGGESTIONS", which is a continuation of U.S. application Ser. No. 11/382,249 filed on May 8, 2006 and entitled "MOBILE PAY-PER-CALL CAMPAIGN CREATION", which is a continuation of U.S. application Ser. No. 11/382,246 filed on May 8, 2006 and entitled "CREATION OF A MOBILE SEARCH SUGGESTION DICTIONARY", which is a continuation of U.S. application Ser. No. 11/382,243 filed on May 8, 2006 and entitled "MOBILE CONTENT SPIDERING AND COMPATIBILITY DETERMINATION", which is a continuation of U.S. application Ser. No. 11/382,237 filed on May 8, 2006 and entitled "IMPLICIT SEARCHING FOR MOBILE CONTENT," which is a continuation of U.S. application Ser. No. 11/382,226 filed on May 8, 2006 and entitled "MOBILE SEARCH SUBSTRING QUERY COMPLETION", which is a continuation-in-part of U.S. application Ser. No. 11/414,740 filed on Apr. 27, 2006 and entitled "EXPECTED VALUE AND PRIORITIZATION OF MOBILE CONTENT," which is a continuation of U.S. application Ser. No. 11/414,168 filed on Apr. 27, 2006 and entitled "DYNAMIC BIDDING AND EXPECTED VALUE," which is a continuation of U.S. application Ser. No. 11/413,273 filed on Apr. 27, 2006 and entitled "CALCULATION AND PRESENTATION OF MOBILE CONTENT EXPECTED VALUE," which is a non-provisional of U.S. App. No. 60/785,242 filed on Mar. 22, 2006 and entitled "AUTOMATED SYNDICATION OF MOBILE CONTENT" and which is a continuation-in-part of U.S. application Ser. No. 11/387,147 filed on Mar. 21, 2006 and entitled "INTERACTION ANALYSIS AND PRIORITIZATION OF MOBILE CONTENT," which is continuation-in-part of U.S. application Ser. No. 11/355,915 filed on Feb. 16, 2006 and entitled "PRESENTATION OF SPONSORED CONTENT BASED ON MOBILE TRANSACTION EVENT," which is a continuation of U.S. application Ser. No. 11/347,842 filed on Feb. 3, 2006 and entitled "MULTIMODAL SEARCH QUERY," which is a continuation of U.S. application Ser. No. 11/347,825 filed on Feb. 3, 2006 and entitled "SEARCH QUERY ADDRESS REDIRECTION ON A MOBILE COMMUNICATION FACILITY," which is a continuation of U.S. application Ser. No. 11/347,826 filed on Feb. 3, 2006 and entitled "PREVENTING MOBILE COMMUNICATION FACILITY CLICK FRAUD," which is a continuation of U.S. application Ser. No. 11/337,112 filed on Jan. 19, 2006 and entitled "USER TRANSACTION HISTORY INFLUENCED SEARCH RESULTS," which is a continuation of U.S. application Ser. No. 11/337,180 filed on Jan. 19, 2006 and entitled "USER CHARACTERISTIC INFLUENCED SEARCH RESULTS," which is a continuation of U.S. application Ser. No. 11/336,432 filed on Jan. 19, 2006 and entitled "USER HISTORY INFLUENCED SEARCH RESULTS," which is a continuation of U.S. application Ser. No. 11/337,234 filed on Jan. 19, 2006 and entitled "MOBILE COMMUNICATION FACILITY CHARACTERISTIC INFLUENCED SEARCH RESULTS," which is a continuation of U.S. application Ser. No. 11/337,233 filed on Jan. 19, 2006 and entitled "LOCATION INFLUENCED SEARCH RESULTS," which is a continuation of U.S. application Ser. No. 11/335,904 filed on Jan. 19, 2006 and entitled "PRESENTING SPONSORED CONTENT ON A MOBILE COMMUNICATION FACILITY," which is a continuation of U.S. application Ser. No. 11/335,900 filed on Jan. 18, 2006 and entitled "MOBILE ADVERTISEMENT SYNDICATION," which is a continuation-in-part of U.S. application Ser. No. 11/281,902 filed on Nov. 16, 2005 and entitled "MANAGING SPONSORED CONTENT BASED ON USER CHARACTERISTICS," which is a continuation of U.S. application Ser. No. 11/282,120 filed on Nov. 16, 2005 and entitled "MANAGING SPONSORED CONTENT BASED ON USAGE HISTORY", which is a continuation of U.S. application Ser. No. 11/274,884 filed on Nov. 14, 2005 and entitled "MANAGING SPONSORED CONTENT BASED ON TRANSACTION HISTORY", which is a continuation of U.S. application Ser. No. 11/274,905 filed on Nov. 14, 2005 and entitled "MANAGING SPONSORED CONTENT BASED ON GEOGRAPHIC REGION", which is a continuation of U.S. application Ser. No. 11/274,933 filed on Nov. 14, 2005 and entitled "PRESENTATION OF SPONSORED CONTENT ON MOBILE COMMUNICATION FACILITIES", which is a continuation of U.S. application Ser. No. 11/271,164 filed on Nov. 11, 2005 and entitled "MANAGING SPONSORED CONTENT BASED ON DEVICE CHARACTERISTICS", which is a continuation of U.S. application Ser. No. 11/268,671 filed on Nov. 5, 2005 and entitled "MANAGING PAYMENT FOR SPONSORED CONTENT PRESENTED TO MOBILE COMMUNICATION FACILITIES", and which is a continuation of U.S. application Ser. No. 11/267,940 filed on Nov. 5, 2005 and entitled "MANAGING SPONSORED CONTENT FOR DELIVERY TO MOBILE COMMUNICATION FACILITIES," which is a non-provisional of U.S. App. No. 60/731,991 filed on Nov. 1, 2005 and entitled "MOBILE SEARCH", U.S. App. No. 60/720,193 filed on Sep. 23, 2005 and entitled "MANAGING WEB INTERACTIONS ON A MOBILE COMMUNICATION FACILITY", and U.S. App. No. 60/717,151 filed on Sep. 14, 2005 and entitled "SEARCH CAPABILITIES FOR MOBILE COMMUNICATIONS DEVICES".

BACKGROUND OF THE INVENTION

1. Field of the Invention

This disclosure relates to the field of mobile communications and more particularly to improved methods and systems directed to targeting advertising to mobile and non-mobile communication facilities accessed by the same user.

2. Description of Related Art

Web-based search engines, readily available information, and entertainment mediums, have proven to be one of the most significant uses of computer networks such as the Internet. As online use increases, users seek more and more ways to access the Internet. Users have progressed from desktop and laptop computers to cellular phones and smartphones for work and personal use in an online context. Now, users are accessing the Internet not only from a single device, but from their televisions and gaming devices, and most recently, from tablet devices. Internet-based advertising techniques are currently unable to optimally target and deliver content, such as advertisements, for a mobile communication facility (e.g., smartphone, tablet device, etc.) because the prior art techniques are specifically designed for the Internet in a non-mobile device context. These prior art techniques fail to take advantage of unique data assets derived from telecommunications and fixed mobile convergence networks. As it becomes commonplace for a user to interchangeably access the Internet via his smartphone, tablet, PC, and television, there is no efficient way to optimally target that same user across all the devices he may use. Therefore, a need exists for a system associated with telecommunications networks and fixed mobile convergence applications that is enabled to select and target advertising content readable by a plurality of mobile and non-mobile communication facilities and that is available from across a number of advertising inventories.

SUMMARY OF THE INVENTION

To overcome the deficiencies of the prior art, what is needed, and has not heretofore been developed, is a system associated with telecommunications networks and fixed mobile convergence applications that is enabled to select and target advertising content readable by a plurality of mobile and non-mobile communication facilities and that is available from across a number of advertising inventories.

In a first embodiment, a system for identifying a same user of multiple communication devices includes one or more computers having computer readable mediums having stored thereon instructions which, when executed by one or more processors of the one or more computers, causes the system to perform the steps of: (a) receiving data corresponding to a first plurality of web page visits via a first device operated by a user, wherein the first device is a mobile or non-mobile communications device; (b) receiving data corresponding to a second plurality of web page visits via a second device operated by a user, wherein the second device is a mobile or non-mobile communications device; (c) determining that the user of the first device is the user of the second device based on identifying that the first plurality of web page visits is substantially the same as the second plurality of web page visits; and (d) selecting and transmitting a sponsored content to the second device for display thereon, wherein the sponsored content has a relevance to the first and second plurality of web page visits. The information relating to the plurality of web page visits includes one or more of: (a) a URL of each respective web page; (b) a time of visiting each respective web page; (c) a duration of visiting each respective web page; (d) an order in with each web page is visited; and (e) a geographic location of the first and second device at the time of visiting each respective web page. The system may be further configured to perform the steps of: (a) determining that a pre-existing universal profile has not been created to identify that the first and second devices are used by the same user; and (b) creating a universal profile for the user containing data corresponding to the first and second devices. The mobile communications device may be a cellular phone, a tablet, a portable media player, or a laptop or notebook computer. The non-mobile communications device may be a television, a cable box, or a personal computer.

In a second embodiment, a system for identifying a same user of multiple communication devices includes one or more computers having computer readable mediums having stored thereon instructions which, when executed by one or more processors of the one or more computers, causes the system to perform the steps of: (a) receiving first data corresponding to (i) a location of a first communication device operated by a user and (ii) a time of day at which the first communication device is situated at the location; (b) receiving second data corresponding to (i) a location of a second communication device operated by a user and (ii) a time of day at which the second communication device is situated at the location; (c) determining that the user of the first communication device is the user of the second communication device based on receiving the first and second data a predetermined number of times; (d) determining that a pre-existing universal profile has not been created to identify that the first and second communication devices are used by the same user; and (e) creating a universal profile for the user containing data corresponding to the first and second communication devices.

In a third embodiment, a system for identifying a same user of multiple communication devices includes one or more computers having computer readable mediums having stored thereon instructions which, when executed by one or more processors of the one or more computers, causes the system to perform the steps of: (a) receiving data corresponding to a first route associated with a first communication device operated by a user, wherein the first route is derived from a plurality of geographic coordinates corresponding to respective locations at which the first communication device was situated; (b) receiving data corresponding to a second route associated with a second communication device operated by a user, wherein the second route is derived from a plurality of geographic coordinates corresponding to respective locations at which the second communication device was situated; (c) determining that the user of the first communication device is the user of the second communication device based on identifying that the first route is the substantially the same as the second route; (d) determining that a pre-existing universal profile has not been created to identify that the first and second communication devices are used by the same user; and (e) creating a universal profile for the user containing data corresponding to the first and second communication devices.

In a fourth embodiment, a system for identifying a same user of multiple communication devices includes one or more computers having computer readable mediums having stored thereon instructions which, when executed by one or more processors of the one or more computers, causes the system to perform the steps of: (a) receiving data corresponding to a first application use-pattern from a first communication device operated by a user; (b) receiving data corresponding to a second application use-pattern from a second communication device operated by a user; (c) determining that the user of the first communication device is the user of the second communication device based on identifying that the first application use-pattern is the same as the second application use-pattern; (d) determining that a pre-existing universal profile has not been created to identify that the first and second communication devices are used by the same user; and (e) creating a universal profile for the user containing data corresponding to the first and second communication devices. The first or second application use-pattern may correspond to at least one of: (a) a set of applications used on the first and second communication devices; (b) an order of applications used on the first and second communication devices; (c) a time of day of use of one or more applications on the first and second communication devices; (d) a duration of application use on the first and second communication devices; and (e) a location of use of one or more applications on the first and second communication devices.

In a fifth embodiment, a system for identifying a same user of multiple communication devices includes one or more computers having computer readable mediums having stored thereon instructions which, when executed by one or more processors of the one or more computers, causes the system to perform the steps of: (a) identifying a first profile associated with a user of a first communication device; (b) identifying a second profile associated with a user of a second communication device; (c) determining that the user of the first communication device is the same as the user of the second communication device based on identifying at least one same datum contained in the first profile and the second profile; (d) determining that a pre-existing universal profile has not been created for the first or second profile; and (e) associating the first and second profiles with a universal profile corresponding to the user. The first or second user profile may be is derived from a login by the user, wherein the login may be an application login or website login.

In a sixth embodiment, a system for identifying a same user of multiple communication devices includes one or more computers having computer readable mediums having stored thereon instructions which, when executed by one or more processors of the one or more computers, causes the system to perform the steps of: (a) receiving data corresponding to a first user-managed asset from a first communication device operated by a user; (b) receiving data corresponding to a second user-managed asset from a second communication device operated by a user; (c) determining that the user of the first communication device is the user of the second communication device based on identifying that the first user-managed asset is the same as the second user-managed asset; (d) determining that a pre-existing universal profile has not been created to identify that the first and second communication devices are used by the same user; and (e) creating a universal profile for the user containing data corresponding to the first and second communication devices. The user-managed assets may be one of (a) stored phone numbers or contacts on the first and second communication devices; (b) types of downloaded applications on the first and second communication devices; and (c) placement of downloaded applications within a graphical user interface of the first and second communication devices.

The universal profile may include at least one of: (a) a payment and billing history associated with the user; (b) a duration of online interactions by the user associated with his respective communication devices; (c) a number of online interactions by the user via his respective communication devices; (d) a usage pattern of the respective communication devices dependent on location or time of day use thereof; (e) a type of content accessed by the user via his respective communication devices; (f) previous search queries entered by the user via his respective communication devices; (g) shopping habits associated with the user; (h) videos, music, or audio listened to or downloaded by the user; (i) previous geographies associated with the user; and (j) web pages visited or applications used by the user via his respective communication devices. The shopping habits may be at least one of: (a) products viewed or purchased on one of the first and second communication devices; (b) purchase amounts of the products purchased on one of the first and second communication devices; (c) purchase dates of the products purchased on one of the first and second communication devices; and (d) elapsed time between a product viewing and a product purchase on one of the first and second communication devices.

The system may be further configured to perform the steps of: (a) selecting a sponsored content based on a relevancy thereof with the universal profile; and (b) transmitting the sponsored content to the second communication device for display thereon. Selection of the sponsored content is based at least on: (a) frequency capping; (b) cross-platform conversion tracking; (c) retargeted advertisements; (d) cross-platform retargeted advertisements; or (e) brand-impact data. The relevancy of sponsored content may further be based on a user characteristic datum associated with the user, including, but not limited to: (a) age, age-range, or birthdate; (b) gender; (c) race; (d) religion; (e) marital status; (f) area code of the phone number assigned to one of the first and second mobile or non-mobile communication devices; (g) zip code; (h) home address; (i) work address; (j) billing address; (k) type of credit card used to pay a carrier providing service to the mobile or non-mobile communication devices; (l) birthplace; (m) employer; (n) employment position; (o) income bracket of the user; (p) model of one of the first and second mobile or non-mobile communication devices; and (q) operating system of one of the first and second mobile or non-mobile communication devices.

In embodiments, the communication device may be mobile or non-mobile, a phone, a mobile phone, a cellular phone, a smartphone, a tablet PC, a laptop computer, a desktop (personal) computer, a television, cable box, a PDA, a portable media (music and/or video) player, or a gaming console. However, the list should not be construed as limiting the invention in any manner.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE INVENTION

By definition, the blurring of the lines between traditional broadcast television and online multimedia content due to consumers owning more than one device with a screen is known as cross-screen capability. The demand for converged cross-screen services and high quality resultant experiences is growing. Consumers want a flexible viewing experience in which personalized content, such as live sports, recorded television programs, on-demand movies, and social media experiences, goes wherever they go and can be shifted from device to device.

As demand for cross-screen service increases, telecommunications evolve into content delivery businesses, and carriers will have new opportunities to leverage their service delivery platforms and collaborate with content providers to develop converged multi-screen offerings. As carriers offer free and premium content over more and more efficient multi-screen options, there is greater opportunity for advertisers to reach their ideal audiences. Furthermore, there are increased opportunities to reach the preferred audiences more than once, thereby offering different content according to the device being used, and ultimately increasing the advertisers' conversion rates. As consumers increasingly use their mobile phones, they still continue to use PCs and TVs. These devices are growing in size and diminishing in heft. For example, in 2010, mobile video, recorded television programs, and PC Internet use grew by 51.2%, 18.1%, and 17.3%, respectively, over use in 2009. Unifying communications brings together presence, instant messaging, voice, video, voice messaging, desktop sharing, and conferencing. This consistency among devices will help users communicate and collaborate using their method and device of choice, while presenting new opportunities for advertisers to reach them.

Typically, a given user may access his smartphone, tablet, PC, and television a number of times during the course of a day. His use of these devices may reflect the time of day or his location. For example, a user may wake up in the morning and read news stories on his smartphone at home and check the weather via his television before leaving for work. While at the office, he likely works from his PC. At lunch or while commuting, he may use his tablet. At home, he likely turns on his television for live or computer programs, while checking sports scores from his smartphone.

Advertisers want to reach the user described in the above example. To optimally reach him, they need to recognize him not just when he accesses a webpage or application from his smartphone, but from all of his mobile and non-mobile communication devices. A recognition system is provided by an advertising network to identify the user to know which advertisements he has already received and responded to without sacrificing the user's privacy.

Figure 1:
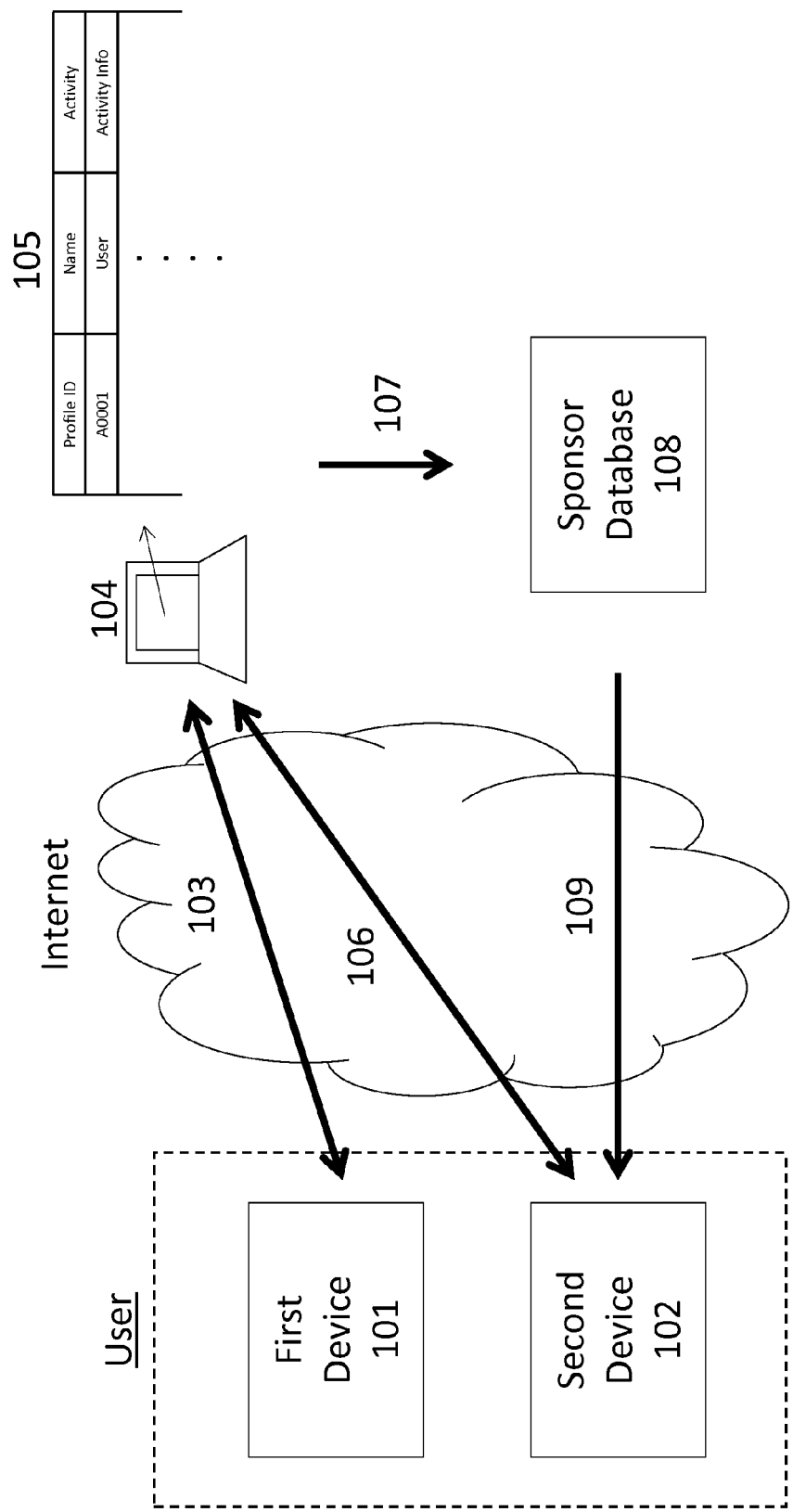
FIG. 1 is a diagram illustrating a wireless platform of a first embodiment in accordance with the present invention.

FIG. 1 depicts a wireless for providing advertisements to multiple communication devices accessed by a user. The wireless includes a first device 101, a second device 102, a server 104, and a sponsor database 108. Although the first device 101 and the second device 102 communicate with server 104 and sponsor database 108 through the Internet in this particular embodiment, other methods of communication are also desirable. Additionally, the server 104 and sponsor database 108 may be centrally located or geographically dispersed, locally and/or remotely interconnected, and may be integrated into a combined system.

In embodiments, the first device 101 and second device 102 may be mobile or non-mobile devices, such as mobile phones, cellular phones, smartphones, GSM phones, tablet PCs, laptop computers, computers, televisions, PDAs, personal media players, and gaming consoles. However, the list should not be construed as limiting the invention in any manner, as other mobile or non-mobile devices are contemplated and would work equally well in the context of the invention.

In the embodiment shown in FIG. 1, server 104 communicates with first device 101 to receive information relating to the user's activity on first device 101. A user's activity may be behavioral pattern, viewing habits, usage information, duration on each application, geographic location information, proximity to other locations, etc. The user activity information is communicated through communication signal 103. User activity information may be continually, or periodically, updated for the user by first device 101. Further, user activity information may be transmitted based on a request from server 104, a periodic transmission by first device 101, or a triggering event on the part of first device 101. Upon receiving the user's activity information, server 104 assigns a unique identifier, which could be alphabetical, numerical, alphanumerical, or symbols to first device 101 and stores the assigned unique identifier, user information and activity information into table 105. In embodiments, table 105 may store additional information, including device information, operator information, carrier information, etc. Server 104 further identifies the second device 102 accessed by the user though a communication signal 106. Again, server 14 may identify second device 102 through a request from server 104, a periodic transmission by the second device 102, or a triggering event on the part of first device 102. Once server 104 makes sure first device 101 and second device 102 are both used by the same user, sever 104 informs sponsor database 108 through communication signal 107 and asks sponsor database 108 to transmit an advertisement to second device 102 through communication signal 109. Additionally, server 104 may transmit table 105 through a request from sponsor database 108, periodic transmission by server 104 or a triggering event based on the activity information. The transmission of the advertisement may occur through channels other than the Internet.

As an example, suppose a user has two devices; first device 101 and second device 102, in which first device 101 is an iPhone and second device 102 is an iPad. For most of the day, user uses his first device 101 or iPhone to check basketball scores on ESPN, stock prices on Yahoo Finance and look for the nearest restaurant on Yelp. All of the user's activities with respect to his iPhone may be recorded and received by server 104 through an Internet connection. It is to be understood that gateways to the Internet may be provided by the respective service providers providing service to each of the devices. As server 104 collects the information on the user's iPhone or first device 101, it may store the information in table 105. The information stored in table 105 could be the way the user checked basketball scores on ESPN, the particular stocks the user monitored on Yahoo Finance and the search queries the user entered on Yelp. At the same time, server 104 identifies user's second device 102 or the iPad. The method of identification could be done through linking identifiers. For example, each device has its own serial number assigned either by the manufacturer or the carrier and therefore, server 104 can collect the respective identifiers and verify the respective owners. The server can also collect identifiers assigned by various third-party publishers and effectively identify the users. Once the owners/operators are identified as the same owner/operator, server 104 may further record such finding in table 105. In a further embodiment, server 104 can request the ad database to transmit an advertisement to second device 102 through the ad database 108 based on the user's usage activity on first device 101. In this example, the ad database will push advertisements potentially pertaining to NBA League Pass, investment strategies from financial services, or restaurant coupons from the restaurants the user searched. In other embodiments, server 104 can wait for a request from ad database 108 to push for an advertisement or server 104 can relay table 105 to ad database 108 periodically for ad database 108 to determine when to transmit an advertisement.

In another embodiment of FIG. 1, second device 102 can be a television. Again, as information is successfully collected from first device 101, server 104 or ad database 108 can initiate a push of advertisements to the user via the television when the television is identified as the user's device. Traditionally, televisions did not have the capability to connect to the Internet and therefore, advertisements can only be used to target viewers on a channel level rather than a user level. Ad agencies would only target advertisements to viewers based on statistics regarding the viewers of a particular channel.

In another embodiment of FIG. 1, activity information can be the IP addresses of the user's devices. By recording and associating the IP addresses to the devices, a server can at least effectively identify the household by where the devices are located. Through analyzing the data transmitted out from the household, the composition of the household can be determined and thus a better idea of what advertisements to push can be realized. In another embodiment, ad server can add the location of the household to better serve its purpose. For example, a college student in a college town viewing news regarding college sports would most likely be interested in sports-related products.

In another embodiment of FIG. 1, activity information can be locations of the user's devices. By tracking the proximity between a user's devices over a predetermined period of time, a server can safely and appropriately conclude that the devices are owned by the same user. As people today often own and carry more than one communication device, the proximity between the more than one communication device is very short, possibly within a couple feet. Furthermore, other criteria like, but not limited to, velocity and speed, of the devices can be taken into account for evaluation. By doing so, a newly purchased device can be linked together immediately to provide a better target for advertisements.

In other embodiments, there can be more than one second device 102 the user owns, and if user does have more than one second device 102, more information about the user can be gathered and more advertisements can be pushed to the user.

Figure 2:
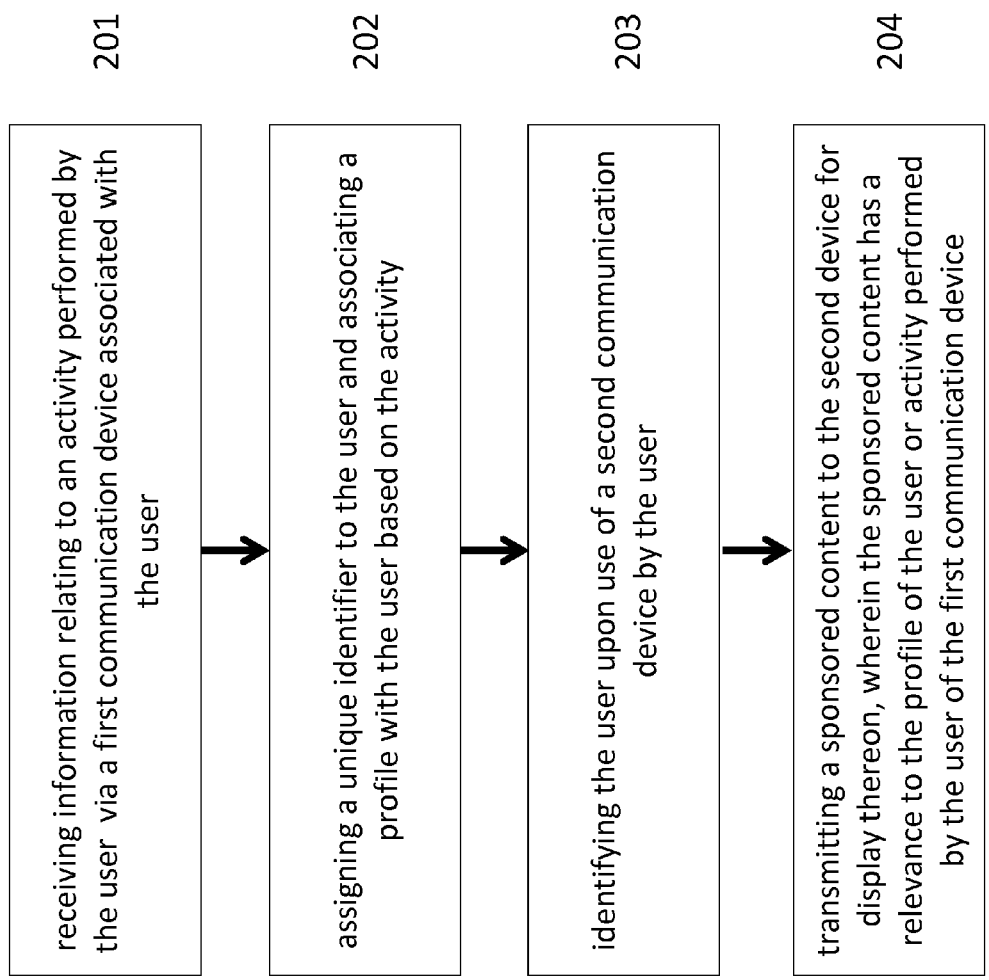
FIG. 2 is a flowchart illustrating the steps of the first embodiment of FIG. 1.

FIG. 2 depicts a flowchart illustrating the steps of pushing a targeted advertisement to a user device. The process starts with step 201 by receiving information relating to an activity performed by the user via a first communication device associated with the user. Step 202 assigns a unique identifier to the user and associating a profile with the user based on the activity. Step 203 identifies the user upon use of a second communication device by the user. Lastly, Step 204 transmits a sponsored content to the second device for display thereon, wherein the sponsored content has a relevance to the profile of the user or activity performed by the user of the first communication device.

An advertising network aggregates data from webpages and applications that are inside or outside its own network. This creates multiple vantage points on the users the advertising network encounters. If a log-in is available, the advertising network will seek to gain access to match keys and make additional links between PC-online (or other non-mobile medium) and mobile. The data the advertising network amasses will be made available to advertisers under the advertising network's brand.

A single user may have multiple profiles, across multiple categories of profiles, based at least in part on multiple web browser activities. When the user accesses the web from multiple devices, collapsing all profiles and activities into a single profile simplifies the unique identifying process.

Figure 3:
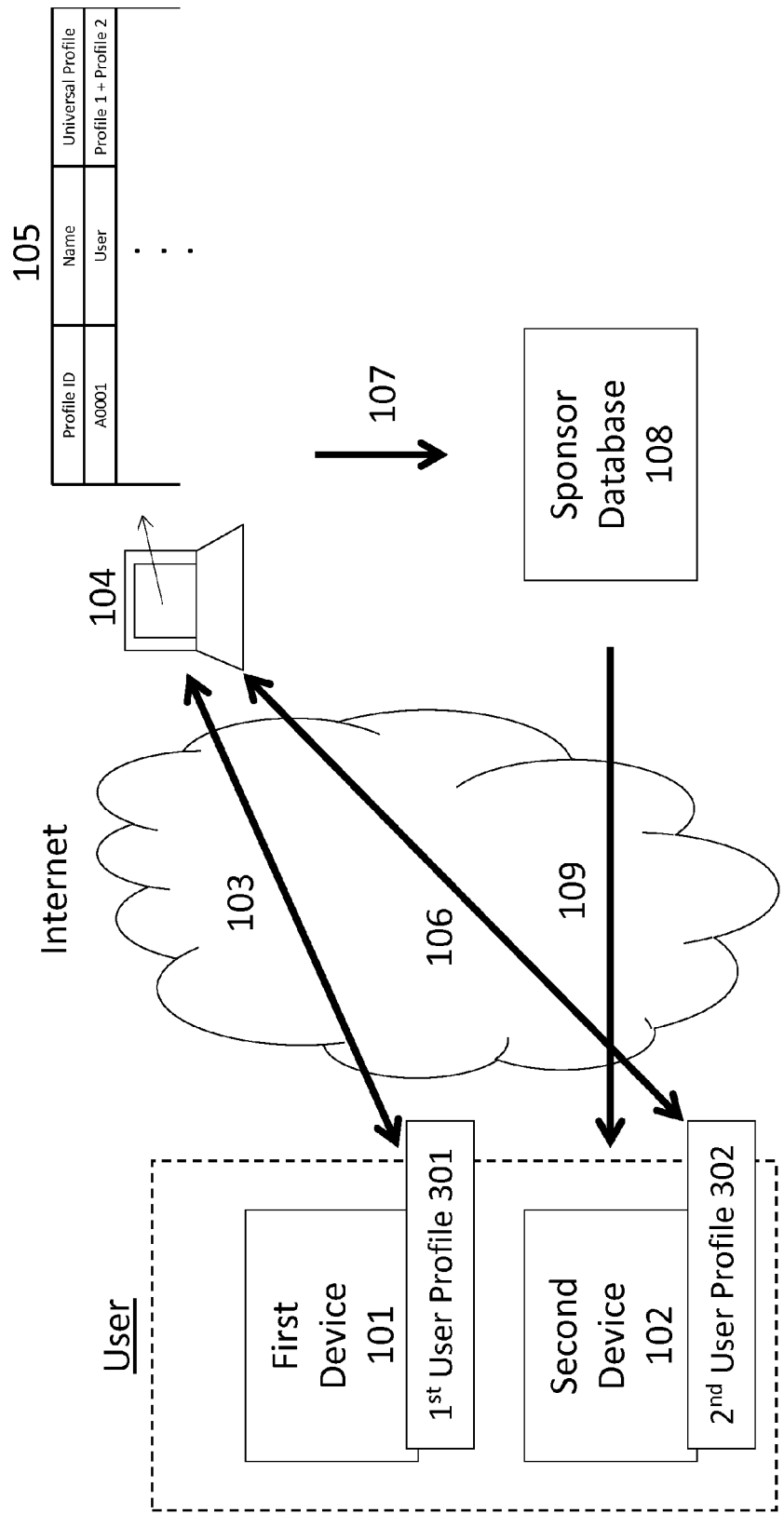
FIG. 3 is a diagram illustrating a wireless platform of a second embodiment in accordance with the present invention.

FIG. 3 depicts a second embodiment of linking two different devices owned by the same owner. Similar to FIG. 1, FIG. 3 includes first device 101, second device 102, server 104, table 105 and sponsor database 108. FIG. 3 further includes a $1^{st}$ user profile 301 associated with first device 101 and a $2^{nd}$ user profile 302 associated with second device 102. Additionally, the server 104 and sponsor database 108 may be centrally located or geographically dispersed, locally and/or remotely interconnected, and may be integrated into a combined system.

In this embodiment, instead of receiving activity information on respective devices by server 104, server 104 receives $1^{st}$ user profile 301 and $2^{nd}$ user profile 302. Examples of the profiles include, but not limited to, mobile login information, application login information. Again, server 104 may receive $1^{st}$ user profile 301 and $2^{nd}$ user profile 302 based on a request from server 104, a periodic transmission by first device 101 and second device 102, or a triggering event on the part of first device 101 and second device 102. As server 104 receives $1^{st}$ user profile 301 and $2^{nd}$ user profile 302 through communication signals 103 and 106, server 104 stores the two profiles into table 105. Server 104 stores and further links $1^{st}$ user profile 301 and $2^{nd}$ user profile 302 together under a universal profile to conveniently identify the user in the future. Server 104 then transmits table 105 to sponsor database 108 through communication signal 107 for sponsor database 108 to push advertisements to second device 102 or first device 101. The determination to push advertisements may be based on a relevancy score between the universal profile and advertisements, such that the advertisements are sent only when the relevancy score is above a predetermined value or threshold. Additionally, server 104 may transmit table 105 through a request from sponsor database 108, periodic transmission by server 104, a triggering event based on examining the universal profile or a triggering event based on linking $1^{st}$ user profile 301 and $2^{nd}$ user profile 302.

An example of FIG. 3 is when a user uses the Facebook application on his iPhone or first device 101 and uses Yelp application on his iPad or second device 102 with a different login information. The login information can be differed through the use of usernames, for instance. After server 104 receives both login information or profiles and linking them, server 104 will communicate with sponsor database 108 to determine, based on a relevancy score, whether it is appropriate to send advertisements to one or both of the two devices owned by the user.

Figure 4:
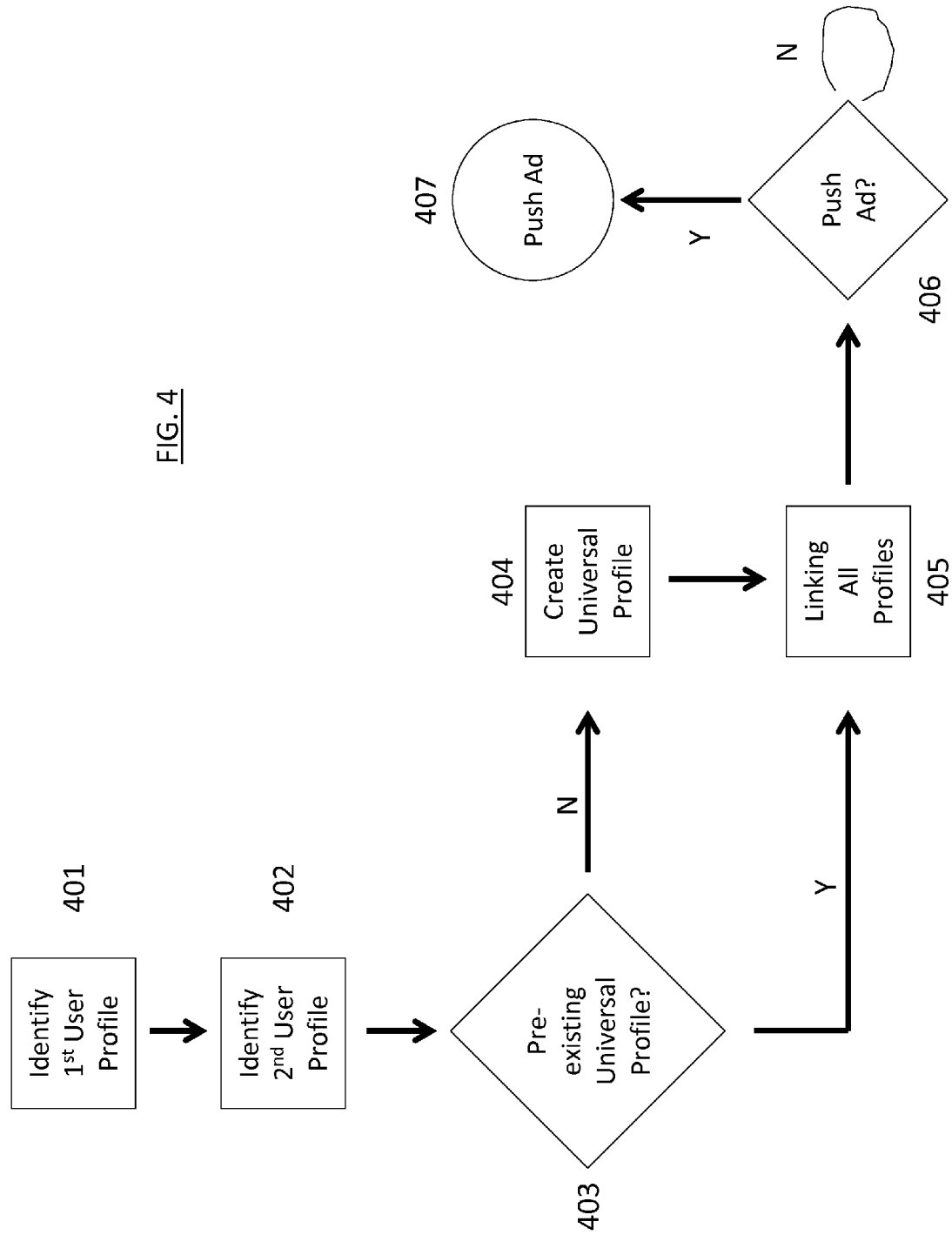
FIG. 4 is a flowchart illustrating the steps of the second embodiment of FIG. 3.

FIG. 4 depicts a flowchart illustrating the steps of creating a universal profile and further pushing a targeted advertisement to a user device. The process starts with step 401 by identifying a first profile associated with a user of a first communication device. Step 402 identifies a second profile associated with the user of a second communication device. Step 403 determines whether a pre-existing universal profile already exists or not. When the answer to Step 403 is N or No, then the process moves to Step 404. Step 404 then proceeds to create a universal profile and links the all profiles together in Step 405. When the answer to Step 403 is a Y or Yes, then the process moves to Step 405 and links the newly identified profiles together. Once the all profiles are linked together, Step 406 will determine whether advertisements should be pushed or not. If the determination based on the relevancy score is below a certain threshold, then it will loop back and wait for another pairing of advertisements and profile. If the determination based on the relevancy score is above a certain threshold, then the process moves to Step 407 and pushes the advertisements to one or both of the devices.

Figure 5:
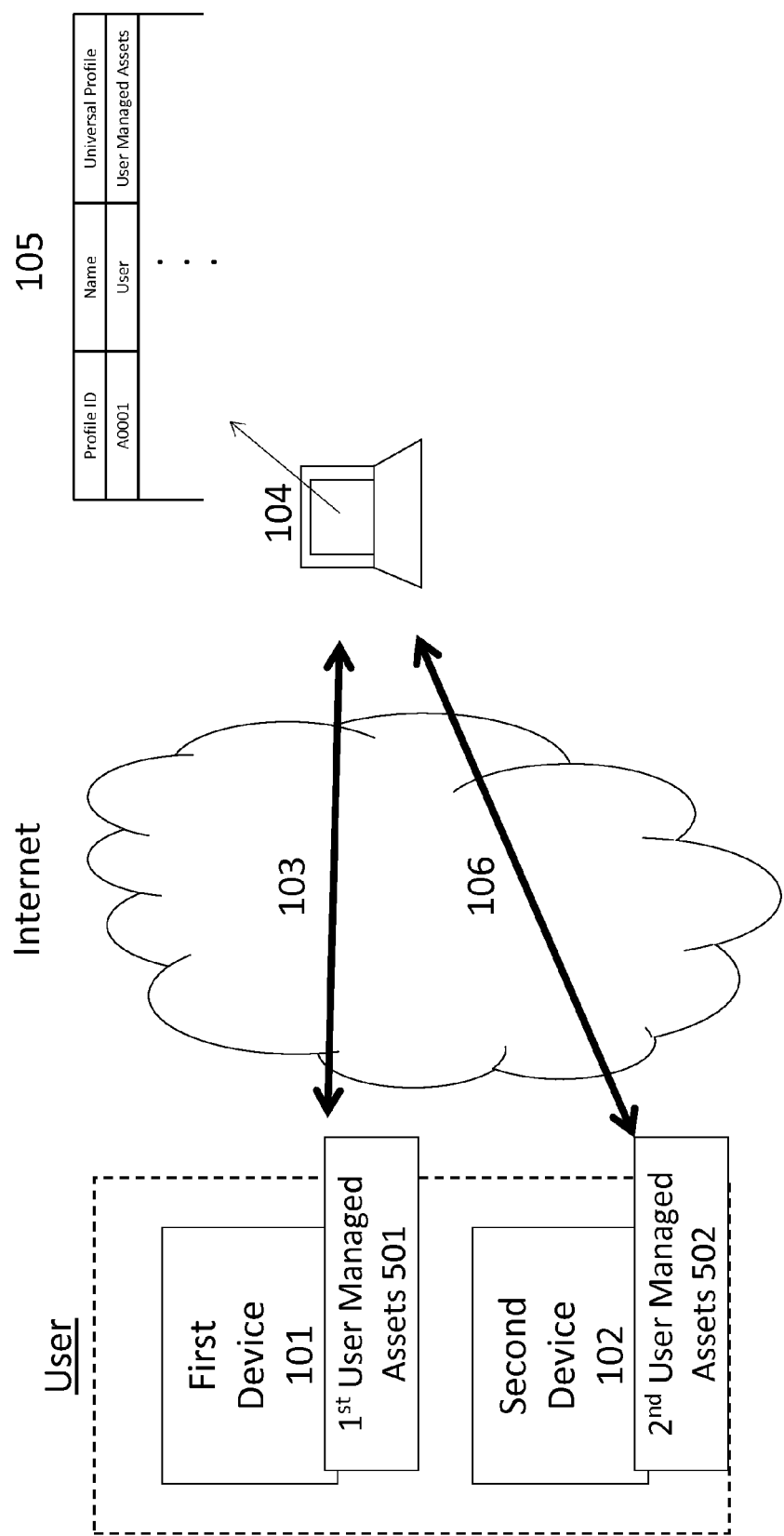
FIG. 5 is a diagram illustrating a wireless platform of a third embodiment in accordance with the present invention.

FIG. 5 depicts a third embodiment of linking two different devices owned by the same owner. Similar to FIG. 3, FIG. 5 includes first device 101, second device 102 and server 104. FIG. 5 further includes a $1^{st}$ user managed assets 501 associated with first device 101 and a $2^{nd}$ user managed assets 502 associated with second device 102. The communications between server 104, first device 101 and second device 102 are via Internet, however, the use of the Internet is merely exemplary and shall not be construed as limiting the invention in any manner. In this embodiment, instead of receiving user profiles on respective devices by server 104, server 104 receives $1^{st}$ user managed assets 501 and $2^{nd}$ user managed assets 502. Examples of the user managed assets include, but not limited to, phone numbers stored, placement of the applications, and type of applications downloaded. Again, server 104 may receive $1^{st}$ user managed assets 501 and $2^{nd}$ user managed assets 502 based on a request from server 104, a periodic transmission by first device 101 and second device 102, or a triggering event on the part of first device 101 and second device 102. Server 104 then makes a determination of whether the received user managed assets indicate a same user of first device 101 and second device 102. When a same user indeed owns (or operates) both first device 101 and second device 102, server 104 then determines whether there is a universal profile for the user and creates or stores a universal profile for the user.

An example of FIG. 5 is that a user may keep the same contact list in his iPhone and his secondary phone or that the user may have the same applications on his iPhone and his secondary phone. The user may have downloaded NBA JAM and ESPN ScoreCenter and placed them on the top left corner on the first page of his iPhone and iPad for easy access. The same download and same placement may effectively allow servers to identify people on an individual level. However, the phone numbers or applications need not be identical on both devices, but they need to have a high correlation in order for server 104 to determine the two devices are owned by the same user.

Figure 6:
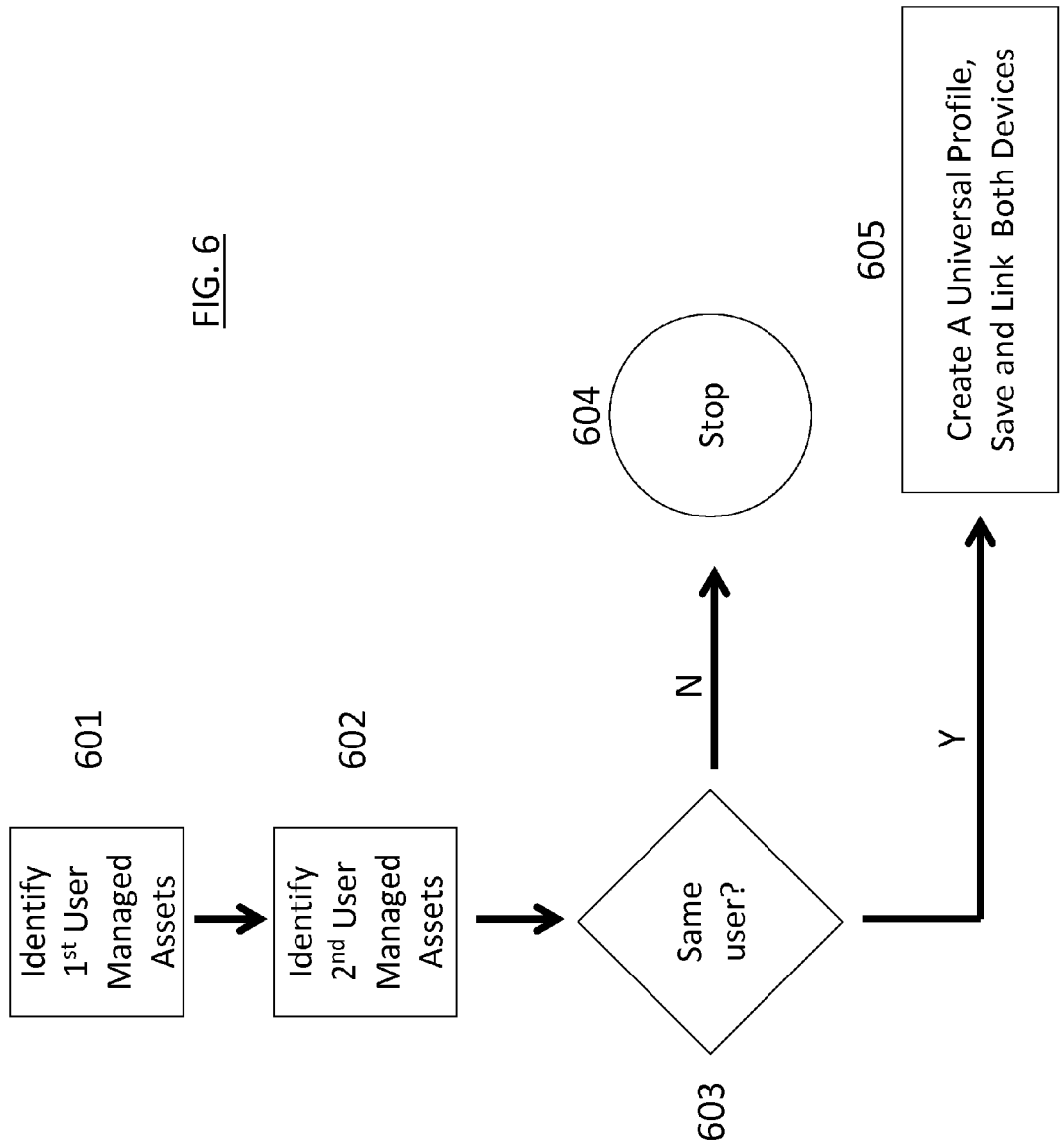
FIG. 6 is a flowchart illustrating the steps of the third embodiment of FIG. 5.

FIG. 6 depicts a flowchart illustrating the steps of linking multiple devices together based on highly similar user managed assets from the multiple devices. The process starts with step 601 by receiving from a first communication device data corresponding to a first plurality of user managed assets existing on a first communication device. Step 602 receives from a second communication device data corresponding to a second plurality of user managed assets existing on a second communication device. Step 603 compares the first plurality of user managed assets to the second plurality of user managed assets and determines whether the communication devices are used by the same user. If Step 603 determines that the users are not the same, then the process will stop at Step 604. If Step 603 determines that the users are the same, then the process will go to Step 605. Step 605 then creates and saves the user in a universal profile that includes both first device 101 and second device 102.

Figure 7:
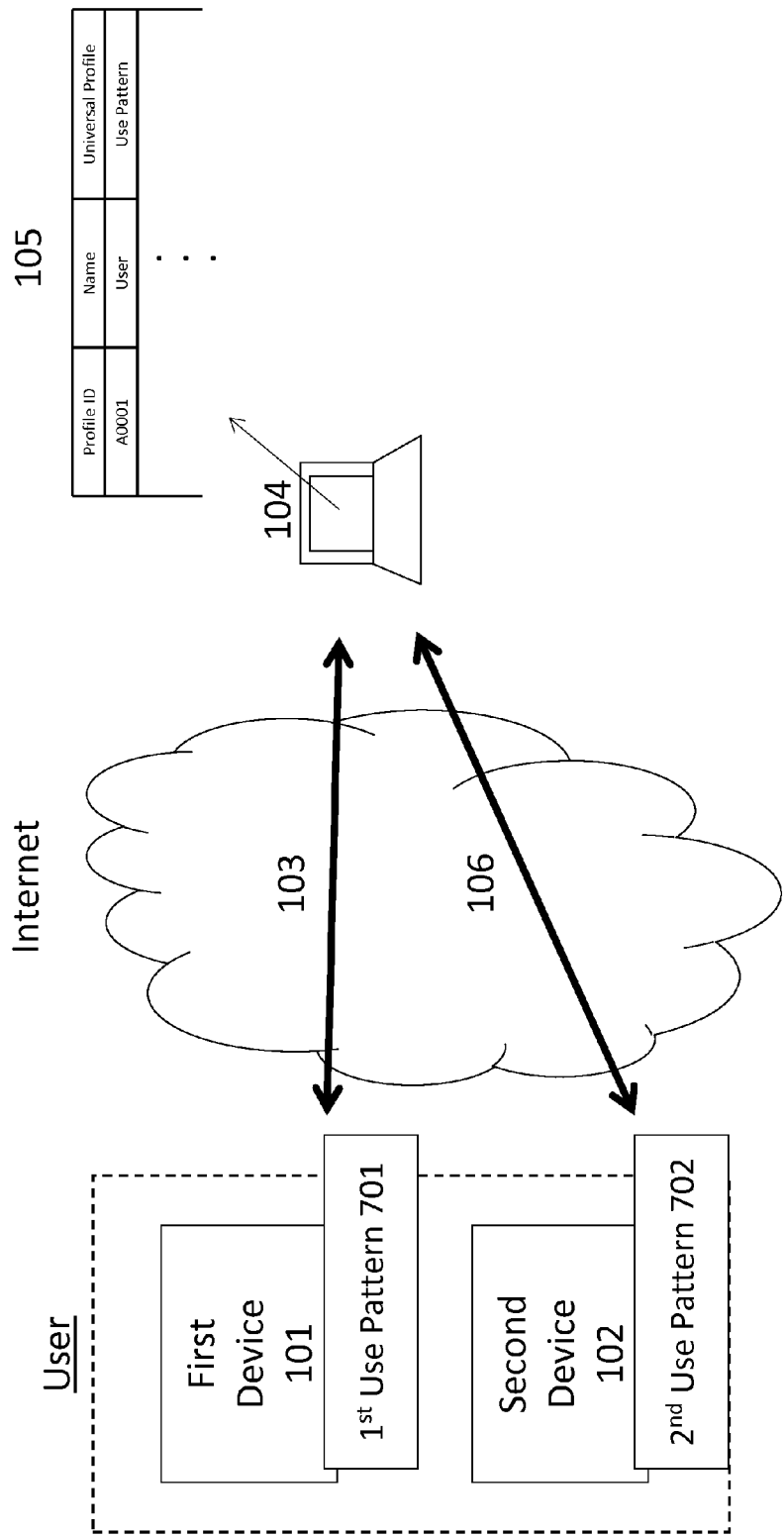
FIG. 7 is a diagram illustrating a wireless platform of a fourth embodiment in accordance with the present invention.

FIG. 7 depicts a fourth embodiment of linking two different devices owned by the same owner. Similar to FIG. 5, FIG. 7 includes first device 101, second device 102, server 104 and table 105. FIG. 7 further includes a $1^{st}$ use pattern 701 associated with first device 101 and a $2^{nd}$ use pattern 702 associated with second device 102. The communications between server 104, first device 101 and second device 102 are via Internet, however, the use of the Internet is merely exemplary and shall not be construed as limiting the invention in any manner.

In this embodiment, instead of receiving user profiles on respective devices by server 104, server 104 receives $1^{st}$ use pattern 701 and $2^{nd}$ use pattern 702. Examples of the use pattern include, but not limited to, ways of using applications, order of using applications, duration of using applications. Again, server 104 may receive $1^{st}$ use pattern 701 and $2^{nd}$ use pattern 702 based on a request from server 104, a periodic transmission by first device 101 and second device 102, or a triggering event on the part of first device 101 and second device 102. Server 104 then makes a determination of whether the received use patterns indicate a same user of first device 101 and second device 102. When a same user indeed owns both first device 101 and second device 102, server 104 then determines whether there is a universal profile for the user and creates or stores a universal profile for the user.

An example of FIG. 7 is that a user may have a habit of going through a series of applications. Specifically, a user may first be playing NBA JAM on his iPhone when he is waiting for bus and as soon as he is done playing, he goes to ESPN ScoreCenter, again on his iPhone, to check the live score of his favorite teams. At another instant, he may be watching an NBA game on television and playing NBA JAM on his iPad, then as soon as he finishes playing NBA JAM on his iPad, he checks ESPN ScoreCenter on the very same device. Such unique pattern of use could effectively be used to identify people on an individual level. The recording of use pattern need not be so specific to the application level. It could be on a level of the type of application. Using the same example, instead of identifying the user playing NBA JAM on his iPhone, he could be identified as playing a sports game, or even to a higher level, playing a game. Therefore, rather than connecting NBA JAM to ESPN ScoreCenter as the user's use pattern, his device could just connect sports game to ESPN ScoreCenter, sports game to broadcasting application, game to ESPN ScoreCenter or game to broadcasting application.

Figure 8:
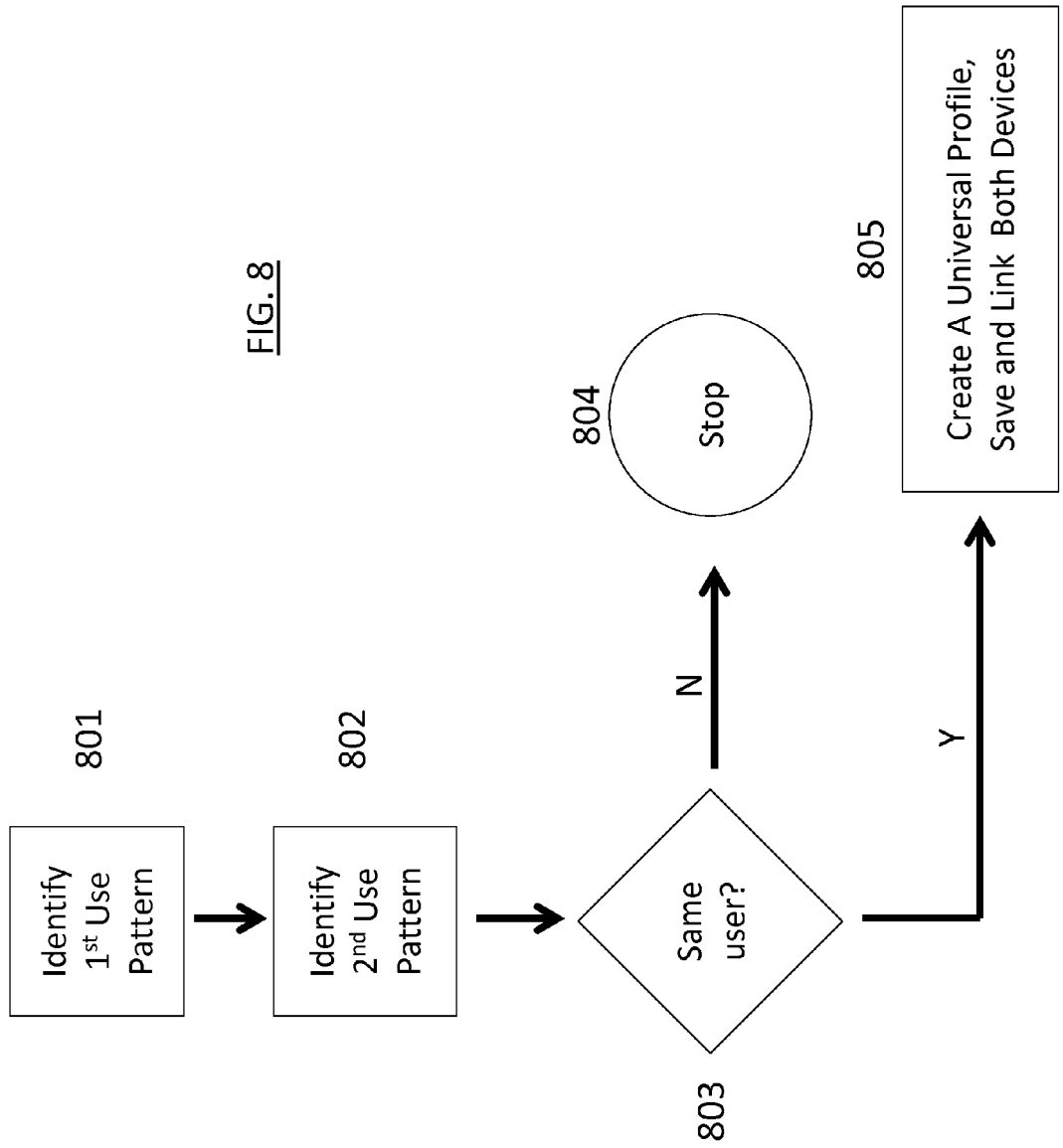
FIG. 8 is a flowchart illustrating the steps of the fourth embodiment of FIG. 7.

FIG. 8 depicts a flowchart illustrating the steps of linking multiple devices together based on highly similar use patterns from the multiple devices. The process starts with step 801 by receiving from a first communication device data corresponding to a first use pattern from interaction by a user of a first communication device with the first communication device. Step 802 receives from a second communication device data corresponding to a second use pattern from interaction by a user of a second communication device with the second communication device. Step 803 compares the first use pattern to the second use pattern and determines whether the communication devices are used by the same user. If Step 803 determines that the users are not the same, then the process will stop at Step 804. If Step 803 determines that the users are the same, then the process will go to Step 805. Step 805 then creates and saves the user in a universal profile that includes both first device 101 and second device 102.

Figure 9:
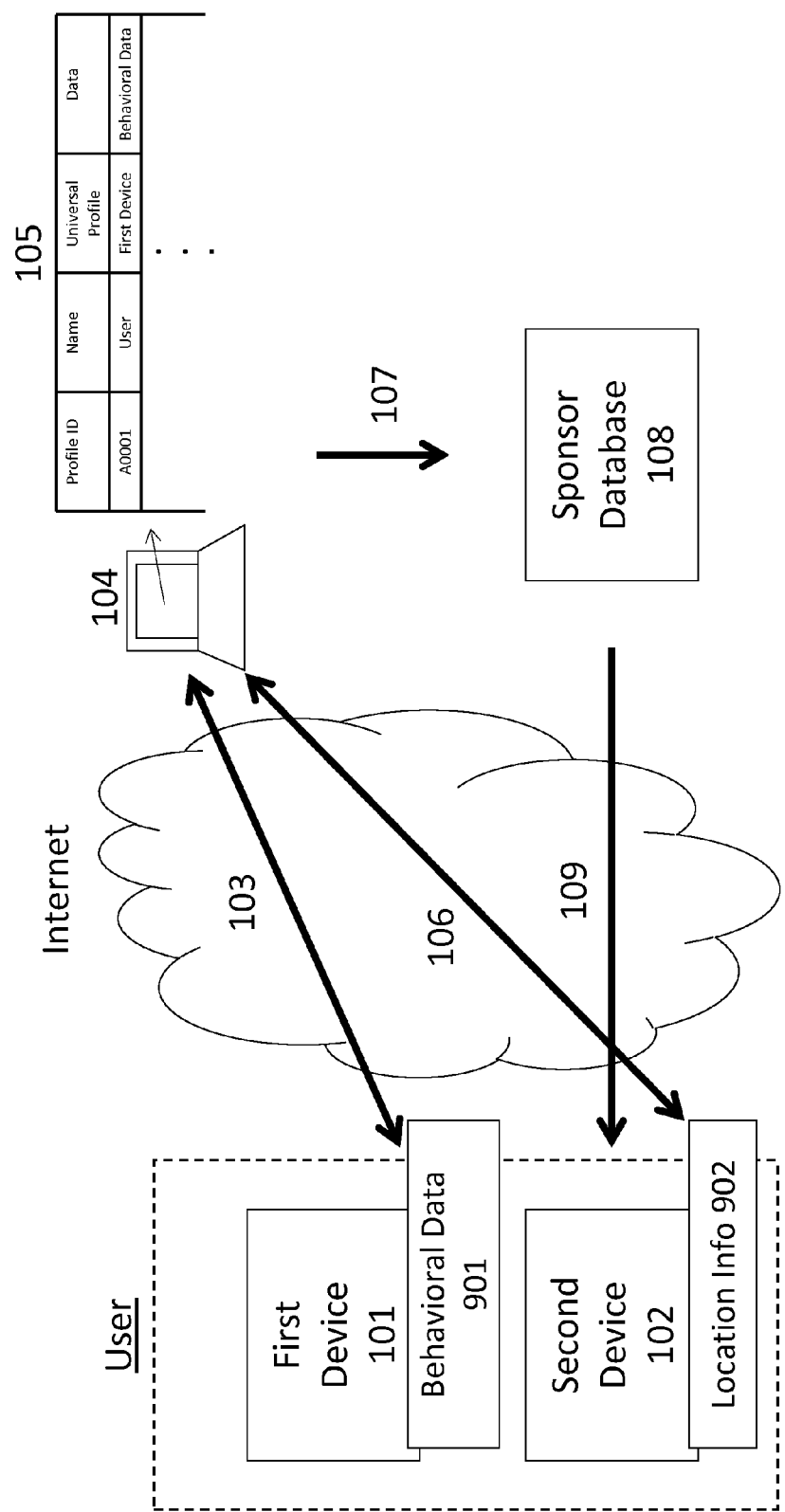
FIG. 9 is a diagram illustrating a wireless platform of a fifth embodiment in accordance with the present invention.

FIG. 9 depicts a fifth embodiment of linking two different devices owned by the same owner. Similar to FIG. 7, FIG. 9 includes first device 101, second device 102, server 104 and table 105. FIG. 9 further includes a sponsor database 108 and behavioral data 901 associated with first device 101 and location info 902 associated with second device 102. The communications between server 104, first device 101 and second device 102 are via the Internet, however, the use of the Internet is merely exemplary and shall not be construed as limiting the invention in any manner. Additionally, the server 104 and sponsor database 108 may be centrally located or geographically dispersed, locally and/or remotely interconnected, and may be integrated into a combined system. In this embodiment, instead of receiving use patterns on respective devices by server 104, server 104 receives behavioral data 901 and location info 902 from first device 101 and second device 102, respectively. Examples of the behavioral data include, but not limited to, location information, duration at each location, potential commercial activity in the location and actual commercial activity in the location. Again, server 104 may receive behavioral data 901 and location info 902 based on a request from server 104, a periodic transmission by first device 101 and second device 102, or a triggering event on the part of first device 101 and second device 102. Server 104 then makes a determination of whether the received behavioral data from first device 101 correlates with the location info from second device 102 and decides if a same user is using both first device 101 and second device 102. When a same user indeed owns both first device 101 and second device 102, server 104 then works with sponsor database 108 to push a sponsored content to second device 102.

An example of FIG. 9 is that a user owns first device 101 or an iPhone and walks around using the iPhone as his personal assistant to find restaurants and other places to go. He finds a coffee shop in the area and continues to visit the coffee shop at least 3 times a week on weekdays. He purchases the same or similar items with his iPhone at the coffee shop. Such behavioral information is recorded by server 104 in table 105 and a universal profile is created for the user if it has not already been created. On a particular weekend, he decides to bring his iPad or second device 102, with or without his iPhone, to the coffee shop. Because his location information, derived from his iPad, revealed that he is visiting the coffee shop, server 104 can identify this seemingly new customer to be the same customer who uses the iPhone and visits on a regular basis. As server 104 recognizes such a match between his recorded behavior and his current location information, server 104 can easily identify the user. Furthermore, to effectively identify the user, server 104 may record the routes the user takes prior and after the user's visit to the coffee shop to provide a higher correlation. For example, knowing that the user almost always goes to the gym before heading to the coffee shop can more accurately identify the user when the user is not carrying the same device. Further, server 104 need not wait until the user enters the coffee shop to make a correlation; instead, server 104 could make such correlation as soon as the user is within 200 feet of the coffee shop or heading in the direction of the coffee shop.

Figure 10:
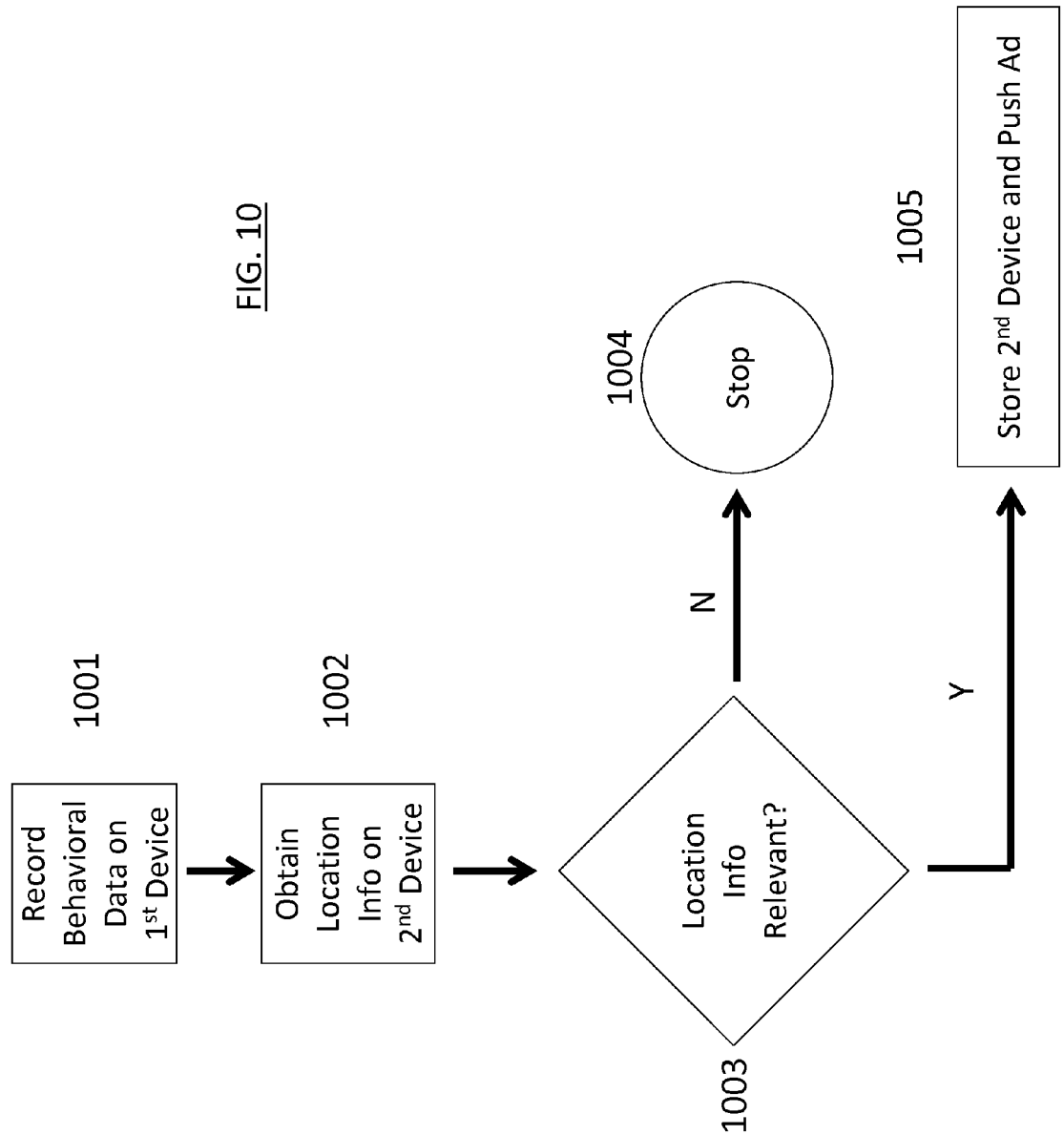
FIG. 10 is a flowchart illustrating the steps of the fifth embodiment of FIG. 9.

FIG. 10 depicts a flowchart illustrating the steps of linking multiple devices together based on highly similar behavioral data from the multiple devices. The process starts with step 1001 by receiving data corresponding to a first communication device accessed by the user, receiving user behavior data corresponding to behavior of the user as derived from use of the first communication device by the user and creating a universal profile for both received information, if necessary. Step 1002 receives location information relating to the user's current location from a second communication device accessed by the user. Step 1003 compares the location information to the user behavior data in the universal profile and determines whether or not the two are relevant. If Step 1003 determines that the information is not relevant, then the process will stop at Step 1004. If Step 1003 determines that the information is relevant, then the process will go to Step 1005. Step 1005 then saves the second device in the universal profile and coordinates with the sponsored database to push for advertisements.

It is to be understood that a universal profile, after its creation, may have dynamic properties attached thereto, as the universal profile may be updated to add or delete further correlations between data, devices, etc. Additionally, the universal profile, or data therein, may be temporal and given set expirations at which time the universal profile/data would no longer be considered valid (e.g., if the system becomes aware that a user discards devices on a frequent basis). Likewise, it is contemplated that the system can check for and account for invalid and/or inconsistent data within the universal profile.

In another embodiment of the present invention, a key activity for an advertising network is to identify match keys for the same user across wired web, mobile web, and mobile application traffic. This enables an advertising network to collapse a profile for a user and create a universal profile. PC-online and offline data suppliers link users to cookies online via anonymous Personally Identifiable Information (PII), known as match keys or "join points." The process entails linking elements such as a name, address, email address or phone number to an identifying "number" on both sides of the transaction, linking a log-in on a mobile website or application with the data suppliers' profile data for that user.

An advertising network may build an audience database of match keys that links users in PC-online and mobile. Match key suppliers enable an advertising network to set its mobile ID (based on hardware ID, header ID, or cookie) and connect that ID with the match key supplier's anonymous PII ID in PC-online. Once the advertising network has the PC-online PII ID, it can look up that user's user profile data from a data source or company.

An advertising network ID is set when a user logs into a publisher or application (a "matchkey provider" (MKP)). The user is recognized when the application sends the advertising network the hardware ID. The advertising network may see an ID in the header, or a publisher attaches a pixel associated with the advertising network that enables a cookie to be served. The matchkey is provided by the MKP passing either obfuscated or encrypted PII (oPII), typically name, address, email, and zip code; or a consistent cross-channel user identifier, typically a login ID or internal user ID; or an MKP ID, which is user ID that is pre-processed to match with the data sources. Use of cookie reflection or 302/303 redirects, as is known in the art, may be used to effectuate communication of a device with the advertising network.

To acquire data, the advertising network connects with the data suppliers with the oPII or matches MKP ID with online MKP ID to receive the matching segments. For example these segments may be "student," "male," "25 years old," and "luxury shopper."

Used in combination with cookies and match keys, a pixel tag is usually a transparent graphic image, usually no larger than one pixel by one pixel, placed on a webpage or in an email. It is used to monitor the behavior of the user visiting the webpage or sending the e-mail. When the HTML code for the pixel tag points to a site to retrieve the image, it can simultaneously pass along information, such as the IP address of the computer that retrieved the image, the type of browser that retrieved the image, and previously set cookie values. Pixel tags are typically used by a third-party to monitor the activity of a site. A pixel tag can be detected by viewing the source code of a webpage and looking for any that load from a different server than the rest of the site. Turning off the browser's cookies will prevent pixel tags from tracking the user's activity. The pixel tag will still account for an anonymous visit, but the user's unique information will not be recorded.

An advertising network may uniquely identify a user by creating a hashed (e.g., anonymized) email address upon noticing the user the first time. The advertising network matches the user to his email address and then hashes the email address.

Once a user is tagged via a unique ID, advertisers can know what the user is interested in, whether the advertiser has targeted the user before, and which specific ads the user has already viewed. An advertiser is provided with a list of user IDs. The advertiser's attributes and sharing restrictions are applied to the data. This enables the advertiser to both positively and negatively target users when they are encountered in a network or on an exchange.

Should the user access a webpage or application from a device he has never previously used, he may be identified via a match key. For example, a user has accessed movie times from his smartphone and is uniquely identified by one of the aforementioned methods. The user then uses his brand new tablet to purchase tickets. Because he is using a device that has never before been used, an advertising network will not be able to recognize him by his previously assigned unique ID. However, when he logs into a webpage or application using his email and password to purchase tickets, the webpage or application can recognize the user by the match key associated with his log in, and assimilate the match key with the user's unique ID. Now the user may be identified on the new device by the same ID associated with him via his smartphone.

Should the user in the above example not log into a webpage or application on a brand new device, he may be identified instead by user behavior and location.

When a user is uniquely identified via the use of one device, the user can be identified via the unique ID upon the user's use of a second device. For example, a user accesses an application from his smartphone to check movie times and is uniquely identified. When the user later uses his tablet to check the news, his previously assigned unique ID triggers advertisements for recently released movies. When he turns on his television and accesses an application to check the weather, the advertisements associated with the weather information will be for local movie theatres or links to purchase tickets.

The cross-screen platform described herein may federate a single identity or profile across all screens. If the same ID is passed to the cross-screen platform across all screens, all profile information may be federated.

An advertising network may operate a data facility containing mobile subscriber characteristics pertaining to individual users of a mobile communication facility. This data may include, but is not limited to, data collected by the wireless provider when an individual opens a wireless account, such as age, sex, race, religion, area code, home address, work address, billing address, credit card information, passwords, family information (e.g., mother's maiden name), birthplace, driver's license number, employer, position, annual income, income bracket, items purchased, friends and family information (including any of the foregoing types of information) and the like. The mobile subscriber characteristics facility may continually, or periodically, update data for individual users, for example, bill amount(s), average bill total, payment history, on-time payment history, on-line usage amount, duration of on-line interactions, number of on-line interactions, family status and family information, number of children, shopping habits (e.g., views of or purchases of goods and services), click stream information, device type and device version, device characteristics, usage patterns (including those based on location, time of day, or other variables), device and/or subscriber unique identifiers, content viewing history, content presented for viewed by/not viewed by user, content and programs downloaded, videos, music, and audio listened to and/or downloaded, television watched, timing and duration of viewing/downloading, transaction history, and any other user or user-defined characteristics. The purchase of physical goods may be facilitated by a wireless provider by having the wireless provider collect the user's credit card information as part of the billing cycle and adding goods transactions automatically to the wireless provider's bill to the user.

The mobile subscriber characteristics database may also track data related to phone usage and location. For example, data collected could include a history of phone calls made, phone calls received, the mobile subscriber characteristics of the persons calling or called by the user, the duration of calls, a history of communications made via phone, Internet, email, instant messaging, or chat (and the entities communicated with by these technologies), history of phone calls made linked with geographic/location information at the time of each call, log of phone numbers, and a history of clicks and clickthroughs (or other keystroke or user interface equivalents thereof, including voice-initiated actions) made using the mobile communication facility.

The device characteristics associated with a mobile communication facility as described herein, may be recorded and stored within a separate database. The device characteristics database may be further associated with other elements of the wireless platform including, but not limited to a wireless provider, contextual information database, mobile subscriber characteristics database, user transaction database, usage history database, location database, sponsor data, advertiser data, carrier business rules database, content walled garden database, a locator facility, the Internet, third party server and an associated database, or some other wireless communication facility.

User transactions associated with a mobile communication facility may be recorded and stored within a separate database. The user transaction database may include, but is not limited to, an online purchase, an offline purchase, an advertisement conversion, a coupon redemption, content interaction, a transfer of funds from a bank account, a transfer of funds from a PayPal, BillPay, or similar online banking account, an item placement in an online shopping cart, a stage at which an incomplete item purchase was terminated, a ratio of item views to item purchases associated with the mobile communication facility, or some other data related to a transaction.

A transaction may be an economic transaction or a non-economic transaction. A non-economic transaction may include, but is not limited to, completing an enrollment, completing a survey, joining a group, subscribing to a free RSS feed, or some other type of non-economic transaction. The user transactions may also be associated with other elements of the wireless platform including, but not limited to a wireless provider, contextual information database, mobile subscriber characteristics database, device characteristics database, usage history database, location database, sponsor data, advertiser data, carrier business rules database, content walled garden database, a locator facility, the Internet, third party server, and an associated database or some other wireless communication facility.

Usage history associated with a mobile communication facility may also be recorded and stored within a separate database. Usage history may include, but is not limited to, a browse history, URL's visited on the mobile communication facility, an advertisement conversation, a text message sent, a text message received, an email sent, and email received, an outgoing call, an incoming call, a call's duration, a conference call's participants, accessing a folder on the mobile communication facility, downloading a content, uploading a content, or some other usage action, event, or history. The usage history may be associated with other elements of the wireless platform as detailed above.

Usage history associated with a mobile communication facility may be recorded and stored within a separate database. In addition to other examples provided, the location may be a previous location; a current location; coordinates of a mobile communication facility; location determined by GPS, triangulation, Wi-Fi triangulation, and the like; location determined by a user entering a region, a state, a city, or the like; location determined according to a distance from a specified location, a location associated with a mobile content; and the like. The location database may be further associated with other elements of the wireless platform as detailed above.

Contextual information associated with website and other content accessed using a mobile communication facility may also be recorded and stored within a separate database. Contextual information may be a link structure, an inbound link, an outbound link, a text, a keyword, keyword combination, metadata, anchor text, or some other type of contextual information. The contextual information may be provided by a server associated with a wireless carrier. The server may be a WAP server, a mobile application gateway, a WAP gateway, a proxy, a webserver, or some other type of server. The contextual information may be further associated with other elements of the wireless platform as described above.

Behavioral retargeting, also known as behavioral remarketing, or simply, retargeting, is a form of online targeted advertising by which online advertising is delivered to consumers based on previous Internet actions, often but not always actions that did not result in a conversion. A conversion is the action intended by the site owner, typically a user making a purchase.

Some companies specialize in retargeting. Other companies have added retargeting to their list of methods of purchasing advertising. Retargeting helps companies advertise to website visitors who leave without a conversion, which is approximately 98% of all web traffic. Displaying ads to prospective consumers as they surf webpages and applications via various advertising networks that the agency buys media from on behalf of their business customers results in conversions. Retargeting is the delivery of advertisements to users who have shown at least some amount of engagement in a given brand. This makes retargeting a smarter spend than most other display advertisement campaigns, as it focuses on a specific brand's engaged user base. Most likely, a company has spent marketing dollars to get a customer to its site in the first place. Therefore, the term "retargeting" derives from the concept of marketing again, but in a different manner Search retargeting, a form of behavioral retargeting, can also be leveraged to drive new customers that have not been to the site before because they are being retargeted based on actions taken on a third-party website.

Studies suggest that a company needs to have an average of seven different contacts with a customer before they make a purchase. Retargeting allows companies to continue the marketing conversation with a customer after they leave a website. This form of behavioral targeting is a growing trend in the online marketing arena.

Advertisers contribute data segments, find their users again in a network, and enable ad advertising delivery company to acquire those users on exchanges. The advertising delivery company allows advertisers to achieve better results via audience that they can build directly (e.g., users who visit Ford's mobile site). In some cases, an advertising delivery company allows advertisers to buy another advertiser's audience. Advertisers can participate in retargeting via (i) exclusive access: only the advertiser targets against their own audience; (ii) shared non-competitive access: contributors allow their data to be used by non-competitive advertisers in exchange for access to the segment data pool. For example, Fidelity can access "high net worth users" as indicated by users visiting Lexus automotive pages; and (iii) shared and open access: All contributors can access all segments.

Personalized retargeting, a related practice, differs from behavioral retargeting as it allows an advertiser to display a banner created on-the-fly for a particular consumer based on their specific browsing behavior. For example, if a consumer visits an advertiser's website and browses products A, B, and C, they will then be retargeted with a display banner featuring the exact products A, B, and C that they previously viewed. Retargeting may span all devices or screens operated by the same user, and may be referred to as cross-screen or cross-platform retargeting.

Location-based retargeting allows for an advertising network to target a user based on a previously-assigned unique ID and the current location from which the unique ID is accessing information. For example, this unit would take into account location and possibly time of the day or location history. If it was around lunch time, it would try to serve up matches to possible lunch places. For instance, as one moves around, an on-screen compass of the advertisement would indicate how close one was to the virtual ad billboard. If the user clicks on the ad billboard, a bar code or quick response code would pop up that the user could use at the restaurant when they walked in. The ad unit would refresh itself every so often with a new location.

An advertiser may want to positively target a particular user on a plurality of screens. A sports game application developer provides the advertising network with IDs for users who have downloaded their sports games in the past. When the advertising network presents an advertisement to those users, a new sports game from the developer is advertised as those users are more likely to purchase another sports game.

An advertiser may want to negatively target a particular user on a plurality of screens. A search engine application provides the advertising network with a list of IDs for users who have downloaded their application previously so that the advertising network does not show those same users an ad for an application that they have already downloaded. Determining which users have already completed the download on at least one device is also known as conversion tracking, or cross-platform conversion tracking An advertiser may want to sequentially target a particular user on a plurality of screens. A dating application provides a list of IDs for users who have downloaded an application, but have not yet upgraded to the paid subscription. When the advertising network encounters those users, a message to upgrade to the paid services may be presented.

An advertiser may want to stop targeting a particular user once the user ID or the user's universal profile has appeared a number of times. An advertiser may determine how many times to target the user before ceasing the delivery of its advertisements. This is known as frequency capping. The advertiser may also limit the number of times to show an advertisement to the same user based on the device the user is operating. For example, an advertiser may want to show an ad to a user no more than five times. The advertiser may predetermine that the ad should appear to the user twice on a tablet and three times on a mobile phone, or the advertiser may simply indicate that the ad should appear five times regardless of which device the user is operating.

Retargeting may expand to brand recognition. An advertising network may track, via clicks or conversions, how users respond to a category or brand on a particular platform. An advertising network may then indicate to its advertisers that, for example, users respond to automotive ads more often on a tablet than on a mobile phone. The same conversions may be tracked for a particular brand.

Metadata to customize advertisements will also add to the cross-screen experience. For example, a webpage may ordinarily include metadata specifying what language it is written in, what tools were used to create it, and where to go for more on the subject, allowing browsers to automatically improve the experience of users. Combining metadata with the cross-screen experience will work like a traditional advertising content but involves customization. The goal is to capture the user's attention when he is focused on another device. Using the accelerometer in a smartphone, a smartphone detects motion and causes the background of an advertisement to ripple (e.g., ocean background, grass blowing in breeze) and the text to move against it slightly while the user is at a PC. Simultaneously, the smartphone features an advertisement that includes a photo from the user's online album or an icon associated with the user. The use-case in mind is to reach a user who might not have noticed the advertisement while on the PC but caught the animation and customization before putting the phone away.

Technographics indicate how to best target consumers in a given area. Many companies approach social media as a list of technologies to be deployed as needed to achieve a marketing goal. But a more coherent approach is to start with the target audience and determine what kind of relationship a business wants to build with them, based on what they are ready for. Technographics is the categorization of social computing behaviors into a ladder with six levels of participation. It describes a population according to its participation in these levels. Brands, webpages, and any other companies pursuing social technologies may analyze their customers' social technographics first and then create a social strategy based on this profile. For example, if a particular region of Maine has a high tablet use and southern Florida has marginal tablet traffic, advertisers who want to target the tablet users may want to show advertisements for cold-weather related living as opposed to beach living.

As advertisements appear across a plurality of devices, there is a growing need for improved methods of paying for these advertisements. A smart pricing strategy for advertisers encompasses a smart pricing system that presents a platform for bidding in real time, wherein the platform offers competitive bidding for advertising space on a multitude of devices. The devices include, but are not limited to, smartphones, mobile phones, tablet devices, PCs, gaming devices, and televisions.

Bids offered by a publisher without a background of information with the advertising network may be placed automatically. Since no prior information exists, an advertising network cannot determine the correct value of the impression. However, a network may use several methods to understand the bid landscape and generate enough bids until a distribution can be created. For example, when there is a new site that the advertising network has no information about, it may place bids using information from a similar publisher, site, or user information. The advertising network may consider reducing the margin so that the advertising network has a better probability of winning bids. If no win results, the advertising network doubles the bid until a win occurs. The reason to double the bid here is to understand if a particular site has a higher reserved price. The advertising network will need to analyze this situation so that it can find the right advertisers for the site. If it appears that there is a relatively high reserve price, compared to what the current candidate advertisers are willing to pay, the advertising network may then adjust the pricing. Since this is a new data point, other advertising networks or exchanges will not have information or incentive to jam the bid at the upper bound of the bid price. However, if the advertising network is winning every time with less than 10% difference between the winning bid and the second price, it should consider reducing the bid by 10% to make sure that there is no gaming of bid price.

The advertising network may generate floating floors for a reserve price. A reserve price prevents advertisers from bidding under a set financial consideration for certain inventory. The financial consideration may be a flat fee, a fixed amount, variable amount, impression-based (e.g., cost per thousand impression, or CPM), cost-per-click (CPC), cost-per-action (CPA), cost-per-engagement (CPE), time-based, based on a shared revenue of user transactions, shared with a wireless operator whose data is being accessed, shared with a publisher, shared with an ad network, or otherwise arranged.

An advertising network may prevent high quality advertisers from bidding on low quality inventory that require low financial considerations. The advertising network could improve the algorithm as it learns more about the data over time. In cost-per-impression campaigns, a bid could be equivalent to what an advertiser is willing to pay, minus the margin.

Other strategies for an advertising network for advertising pricing include autonomic, or adaptive bidding. Bidding the true valuation of the impression is the dominant strategy. At a high level, the methodology is to assign the highest bid to the impression. However, market dynamics will have to be countered to explore the bid landscape.

Autonomic bidding may use historical information and explore bid landscape. Conversely, autonomic bidding may exploit current bids as is, keep historical win bids to learn the bid landscape, and explore reducing bids. It may also ensure that either competitors or the advertising exchanges are not increasing the bids themselves.

Autonomic bidding may explore a bid landscape. It may vary bids to understand if there is any interaction with other advertising networks or if advertising networks can dominate an arbitrage opportunity. A randomly assigned reserve price selected from a distribution of reserve prices helps prevent other advertising networks from exploiting a rival's reserve prices. Autonomic bidding may decide when to maintain the bid and when to increase or decrease.

Another aspect of autonomic bidding is inventory selection. This bidding strategy may select the right inventory in order not to provide the advertising exchange the ability to manipulate impression calls to the advertising network.

Advertising exchanges send a selective call for bids when an impression arrives. Advertising networks compute the value of the impression and return a bid. Sophisticating advertising exchanges allow comparison of similar inventory sent to advertising networks and comparison of the bid price in real time bidding. Two scenarios exist here. First, when an advertising network always wins in real time bidding with a bid price, it wins and pays the second highest bid. In real time bidding, the advertising network only pays the second price, which would be less than the price paid if sold in its own bidding system. The advertising exchange can increase revenue by diverting more traffic to its own system instead of real time bidding for the same inventory.

When the advertising network loses in real time bidding, the winner pays at least as much as the advertising network was willing to pay, or more if the advertising network is not the second highest bid. In its own system, the advertising network shares all the revenue, which is less than what the exchange can earn in the real time auction. The advertising exchange can increase revenue by diverting more traffic to real time bidding instead of its own system for the same inventory.

The real time bidding strategies also exist for advertisers. Advertisers may strike a balance between network bidding and real time bidding.

In bidding, advertising networks may plan for an inventory hold out. Although there is a randomization step that occurs in the yield optimization algorithm, if there is a consistent winner for every auction, up to 80% of the time, this winner will be chosen. This method will result in exhausting the budget of this winner and, later in the day if there are impressions that require higher bids, the advertising network may not have any parties to bid.

The methods and systems described herein may be deployed in part or in whole through a machine that executes computer software program codes, and/or instructions on one or more processors. The one or more processors may be part of a server, client, network infrastructure, mobile computing platform, stationary computing platform, cloud computing, or other computing platform. The processor(s) may be communicatively connected to the Internet or any other distributed communications network via a wired or wireless interface. The processor(s) may be any kind of computational or processing device capable of executing program instructions, codes, binary instructions and the like. The processor(s) may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor(s) may enable execution of multiple programs, threads, and codes. The threads may be executed simultaneously to enhance the performance of the processor(s) and to facilitate simultaneous operations of the application. The processor(s) may include memory that stores methods, codes, instructions and programs as described herein and elsewhere. The processor(s) may access a storage medium through an interface that may store methods, codes, and instructions as described herein and elsewhere. The storage medium associated with the processor(s) for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object-oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media. When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article. The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, LTE, WiMax. A non-transitory computer-readable medium includes all computer-readable medium as is currently known or will be known in the art, including register memory, processor cache, and RAM (and all iterations and variants thereof), with the sole exception being a transitory, propagating signal.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the described databases may, in a known manner, be stored locally or remotely from a device that accesses data in such a database.

Numerous embodiments are described in this patent application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with various modifications and alterations. Although particular features of the present invention may be described with reference to one or more particular embodiments or figures, it should be understood that such features are not limited to usage in the one or more particular embodiments or figures with reference to which they are described.

In the foregoing description, reference is made to the accompanying drawings that form a part of the present disclosure, and in which are shown, by way of illustration, specific embodiments of the invention. These embodiments are described in sufficient detail to enable those skilled in the art to practice the invention, and it is to be understood that other embodiments may be utilized and that structural, logical, software, electrical and other changes may be made without departing from the scope of the present invention. The present disclosure is, therefore, not to be taken in a limiting sense. The present disclosure is neither a literal description of all embodiments of the invention nor a listing of features of the invention that must be present in all embodiments.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed:

1. A system for identifying a same user of multiple communication devices, the system comprising one or more computers having computer readable media having stored thereon instructions which, when executed by one or more processors of the one or more computers, causes the system to perform the steps of:
    (a) receiving at least three times within a week first data corresponding to (i) a location of a first communication device operated by a user on a weekday and (ii) a purchase of a type of item with the first communication device at the location;
    (b) receiving second data corresponding to (i) a location of a second communication device operated by a user on a weekend and (ii) a purchase of the same type of item with the second communication device at the location, wherein the location of the first and second devices is the same;

(c) determining that the user of the first communication device is the user of the second communication device based on the received first and second data indicating that the first communication device purchased the same type of item in the same location as the second communication device; and (d) creating a universal profile for the user containing data corresponding to the first and second communication devices, wherein the universal profile includes data that identifies the first and second communication devices as being operated by the user.

2. The system of claim 1, wherein the universal profile includes at least one of:

(a) a payment and billing history associated with the user;
(b) a duration of online interactions by the user associated with his respective communication devices;
(c) a number of online interactions by the user via his respective communication devices;
(d) a usage pattern of the respective communication devices dependent on location or time of day use thereof;
(e) a type of content accessed by the user via his respective communication devices;
(f) previous search queries entered by the user via his respective communication devices;
(g) shopping habits associated with the user;
(h) videos, music, or audio listened to or downloaded by the user;
(i) previous geographies associated with the user; and
(j) webpages visited or applications used by the user via his respective communication devices.

3. The system of claim 2, wherein the universal profile includes shopping habits associated with the user, and the shopping habits are at least one of:

(a) products viewed or purchased on one of the first and second communication devices;
(b) purchase amounts of the products purchased on one of the first and second communication devices;
(c) purchase dates of the products purchased on one of the first and second communication devices; and
(d) elapsed time between a product viewing and a product purchase on one of the first and second communication devices.

4. The system of claim 2, wherein the system is further configured to perform the steps of:

(a) selecting a sponsored content based on a relevancy thereof with the universal profile; and
(b) transmitting the sponsored content to the second communication device for display thereon.

5. The system of claim 4, wherein the selection of the sponsored content is based at least on:

(a) frequency capping;
(b) cross-platform conversion tracking;
(c) retargeted advertisements;
(d) cross-platform retargeted advertisements; or
(e) brand-impact data.

6. The system of claim 4, wherein the relevancy is further based on a user characteristic datum associated with the user.

7. The system of claim 6, wherein the user characteristic datum is selected from the list consisting of:

(a) age, age-range, or birthdate;
(b) gender;
(c) race;
(d) religion;
(e) marital status;
(f) area code of the phone number assigned to one of the first and second communication devices;
(g) zip code;
(h) home address;
(i) work address;
(j) billing address;
(k) type of credit card used to pay a carrier providing service to the respective communication devices;
(l) birthplace;
(m) employer;
(n) employment position;
(o) income bracket of the user;
(p) model of one of the first and second communication devices; and
(q) operating system of one of the first and second the communication devices.

8. The system of claim 1, wherein the first and second communication devices are one of:

(a) a cellular phone;
(b) a tablet;
(c) a portable media player; and
(d) a laptop or notebook computer.

* * * * *